(12) United States Patent
Minemura

(10) Patent No.: US 8,169,737 B2
(45) Date of Patent: May 1, 2012

(54) TAPE LIBRARY APPARATUS

(75) Inventor: Tsukasa Minemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/050,020

(22) Filed: Mar. 17, 2011

(65) Prior Publication Data

US 2011/0235209 A1 Sep. 29, 2011

(30) Foreign Application Priority Data

Mar. 26, 2010 (JP) ................................. 2010-073826

(51) Int. Cl.
*G11B 15/68* (2006.01)

(52) U.S. Cl. ...................................................... 360/92.1
(58) Field of Classification Search ................. 360/92.1; 720/630, 645, 632; 369/30.45, 30.43
See application file for complete search history.

(56) References Cited

U.S. PATENT DOCUMENTS 7,016,144 B2 * 3/2006 Yamakawa et al. .......... 360/92.1

FOREIGN PATENT DOCUMENTS

| JP | 06-103677 | 4/1994 |
| JP | 11-053813 | 2/1999 |
| JP | 2001-126354 | 5/2001 |

* cited by examiner

*Primary Examiner* — Allen Cao

(74) *Attorney, Agent, or Firm* — Fujitsu Patent Center

(57) ABSTRACT

A tape library apparatus includes a recording/reproducing unit for accessing data in the tape cartridges, a first driver for producing a driving force, a conveyer for carrying the recording/reproducing unit in the direction of the alignment of the plurality of the tape cartridges, by the driving force produced by the first driver, an identification information reader mounted near the insertion slot and on a surfaces of the tape cartridges, the image identification information being on a surface of each of the tape cartridges which faces opposite to a surface which faces the conveyer, a second driver for moving the tape cartridge in the magazine at opposed position of the conveyer to the recording/reproducing unit, and a controller for controlling the first and second drivers, to move one of the tape cartridges stored in the magazine to a position of the recording/reproduction unit.

3 Claims, 25 Drawing Sheets

FIG. 10

| SLOT | TAPE CARTRIDGE NUMBER |
|---|---|
| 8A | ERR |
| 8B | 1025 |
| 8C | 5050 |
| 8D | ERR |
| 8E | 2330 |

| SLOT | TAPE CARTRIDGE NUMBER |
|---|---|
| 8A | 3511 |
| 8B | 1025 |
| 8C | 5050 |
| 8D | NONE |
| 8E | 2330 |

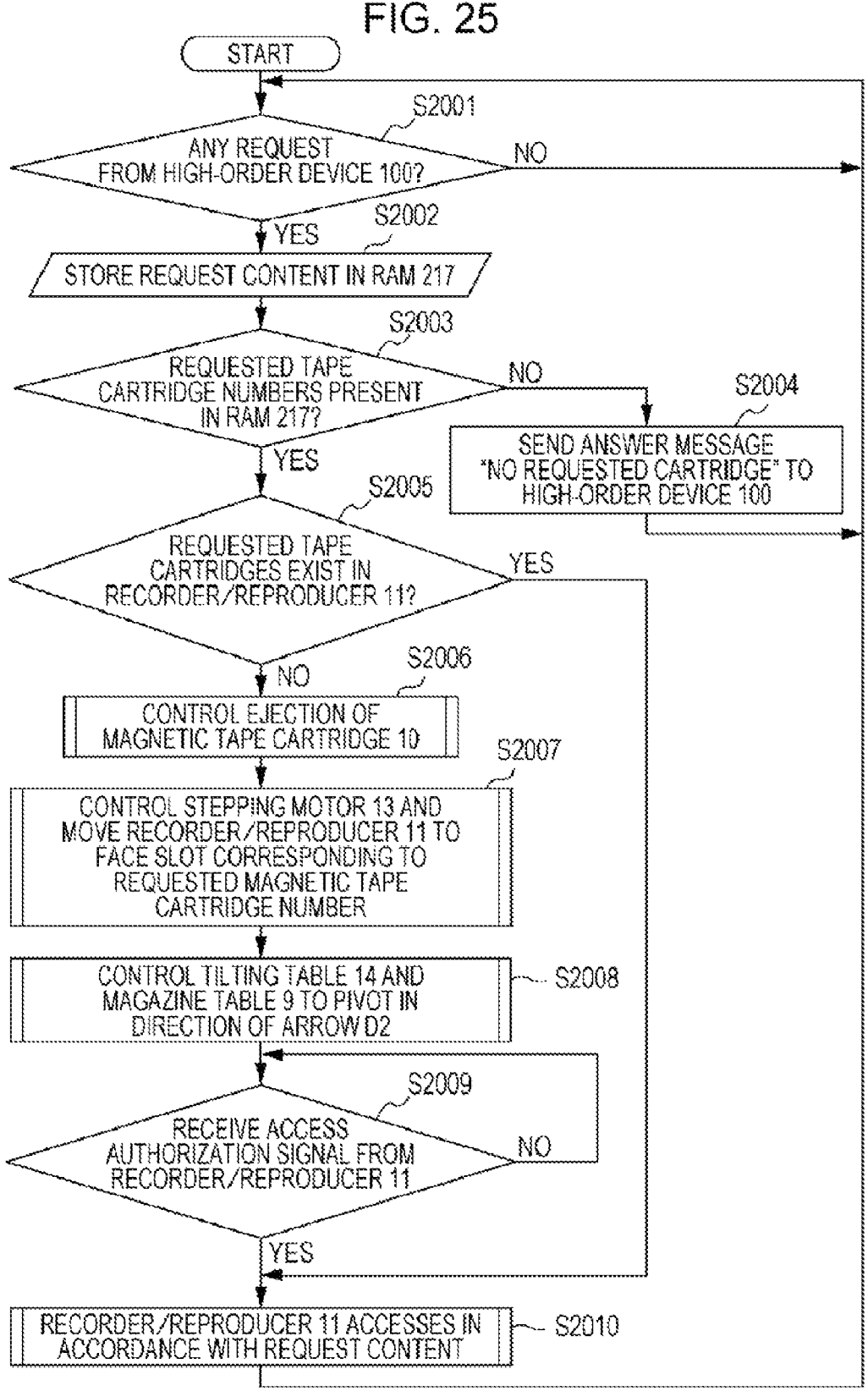

TAPE LIBRARY APPARATUS

CROSS-REFERENCE TO RELATED APPLICATION

This application is based upon and claims the benefit of priority of the prior Japanese Patent Application No. 2010-073826 filed on Mar. 26, 2010 the entire contents of which are incorporated herein by reference.

FIELD

The embodiment discussed herein is related to a tape library apparatus.

BACKGROUND

An exemplary tape library device used in, for example, a computer system contains a plurality of substantially box-shaped magnetic tape cartridges and accesses these magnetic tape cartridges in response to instructions from a high-order device, such as a computer.

Such a tape library device is usually equipped with a cassette magazine with a plurality of tape cartridge slots. The magnetic tape library device includes a conveyance mechanism for moving the magnetic tape cartridges out of the cassette magazine to a reader/writer which is fixed to a predetermined position.

The magnetic tape cartridges contained in the magnetic tape library device can be replaced by an administrator user and thus the cartridges received in each of the cassette slots are not always identical.

The magnetic tape library device therefore usually uses magnetic tapes each of which has an identification barcode printed thereon. The barcode is read by a barcode reader provided in a medium conveyance mechanism to thereby identify the magnetic tape cartridge received in each of the slots of the cassette magazine.

Since the conveyance mechanism of such a magnetic tape library device usually inserts the magnetic tape cartridge which is being conveyed through a cassette opening provided in the reader/writer, a recording surface of the magnetic tape cartridge often faces the cassette opening. In addition, the magnetic tape cartridge is inserted in the reader/writer and ejected from the slot often along the same axial direction.

For these reasons, the conveyance mechanism often ejects and inserts the magnetic tape cartridges at the surfaces opposite to the recording surfaces, and the magnetic tape cartridges are often received in the slots of the cassette magazine with the surfaces opposite to the recording surfaces facing the conveyance mechanism.

In addition, as described above, the related art magnetic tape cartridges have been identified by a barcode reader provided in the conveyance mechanism.

Thus, the related art magnetic tape cartridges often have an identification barcode printed on the surface opposite to the reading surface.

Recently, in addition to the above-described magnetic tape library devices having a conveyance mechanism and a reader/writer which are separately provided (hereinafter, referred to as a "separated magnetic tape library device"), magnetic tape library devices in which a reader/writer is incorporated in a conveyance mechanism (hereinafter, referred to as an "integrated magnetic tape library device") have been proposed (see, for example, Japanese Laid-open Patent Publication Nos. 2001-126354 and No. 11-53813).

SUMMARY

According to an aspect of the invention, A tape library apparatus includes a magazine holder for holding a magazine removable, the magazine storing a plurality of tape cartridges in a linear manner, an insertion slot for inserting the magazine, a recording/reproducing unit for accessing data in the tape cartridges, a first driver for producing a driving force, a conveyer for carrying the recording/reproducing unit in the direction of the alignment of the plurality of the tape cartridges, by the driving force produced by the first driver, an identification information reader mounted near the insertion slot and on a surfaces of the tape cartridges, the image identification information being on a surface of each of the tape cartridges which faces opposite to a surface which faces the conveyer, a storage unit for storing related information, the related information being information of relation between the image identification information read by the identification information reader and locations of the tape cartridges stored in the magazine, a second driver for moving the tape cartridge in the magazine at opposed position of the conveyer to the recording/reproducing unit, and a controller for controlling the first and second drivers, to move one of the tape cartridges stored in the magazine to a position of the recording/reproduction unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is a table of tape cartridge information stored in a RAM.

FIG. 11 is a table of tape cartridge information stored in the RAM.

FIG. 25 is a process flowchart of the magnetic tape library device in response to a request from a high-order device.

DESCRIPTION OF EMBODIMENT

Hereinafter, a embodiment will be described.

Figure 1:
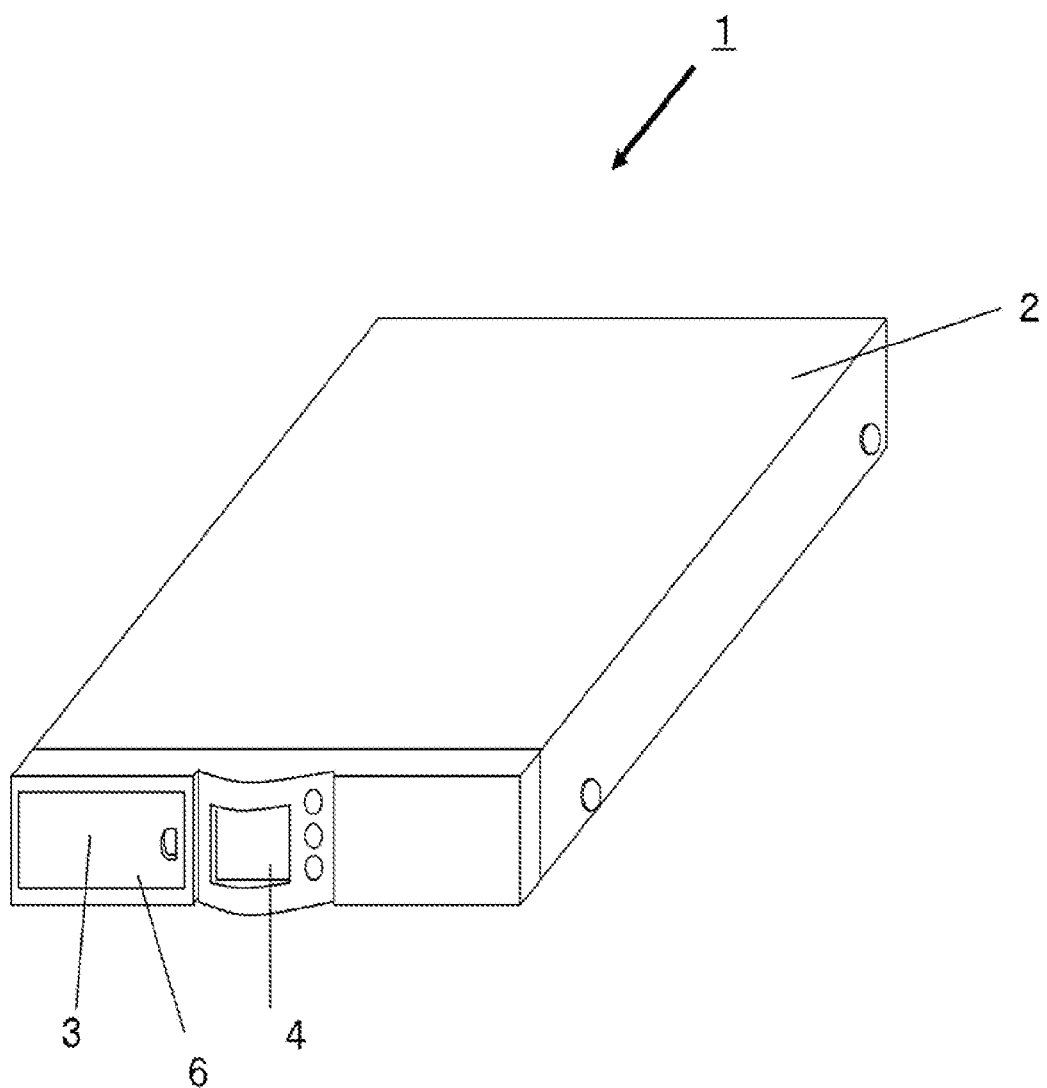
FIG. 1 is an external view of a magnetic tape library device.

FIG. 1 is an external view of a magnetic tape library device 1 according to the present embodiment.

In FIG. 1, a cover 2 is illustrated covering components of the magnetic tape library device 1. A lid 3 is provided on the front of the magnetic tape library device 1 at a magazine opening 6 through which a later-described magazine 8 is inserted. An operator panel 4 is provided for operator manipulations on the front of the magnetic tape library device 1. The operator panel 4 includes operation buttons and a display unit.

Figure 2:
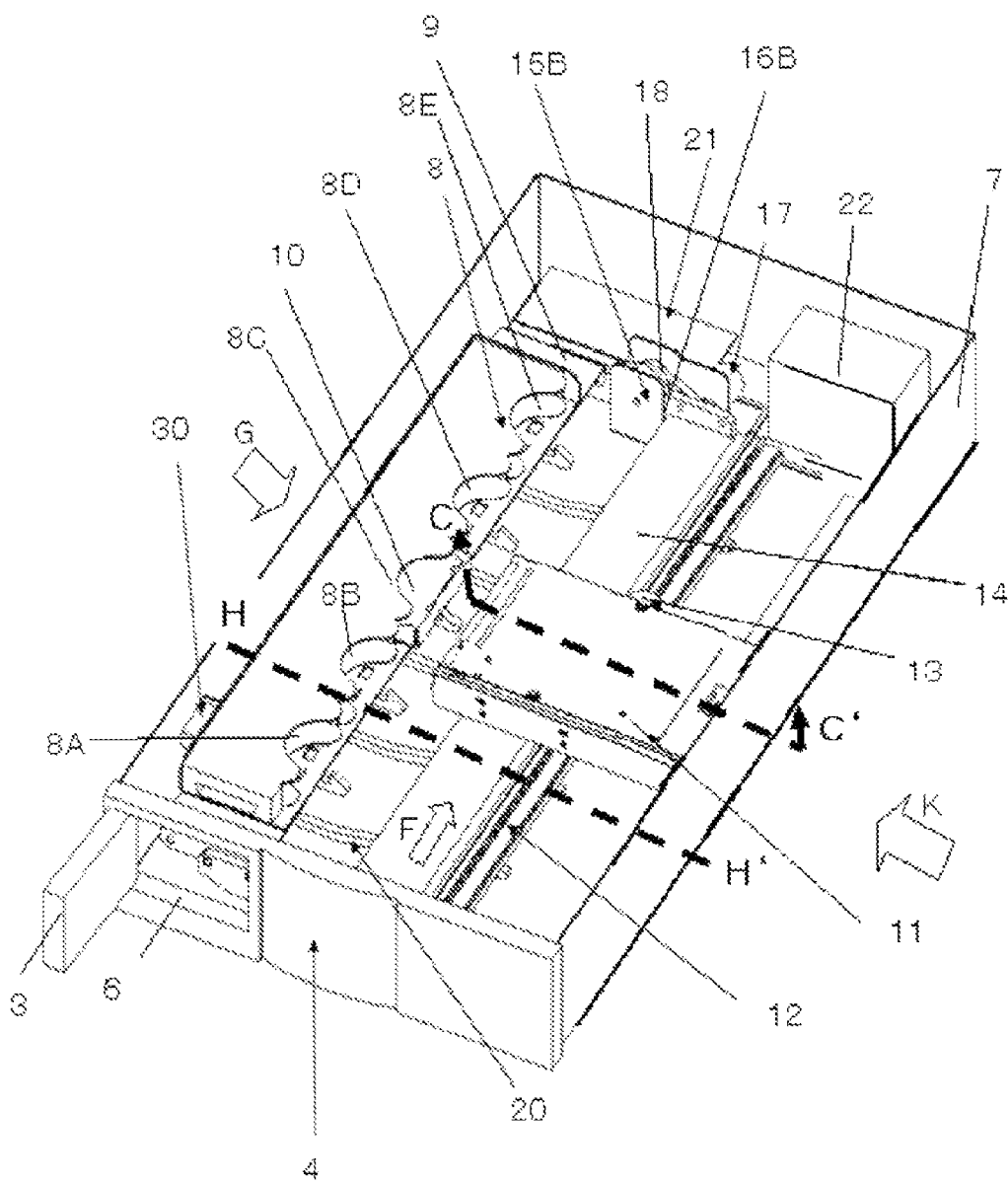
FIG. 2 is a perspective view of the magnetic tape library device with a cover ejected therefrom.

FIG. 2 is a perspective view of the magnetic tape library device 1 with the cover 2 ejected therefrom.

In FIG. 2, the components on the front of the magnetic tape library device 1, e.g., the operator panel 4, are illustrated in a simplified manner but actually are the same as those illustrated in FIG. 1. The lid 3 is illustrated as opened in FIG. 2.

In FIG. 2, a lower housing 7 forms a housing together with the cover 2 illustrated in FIG. 1 placed thereon. The magazine 8 includes slots 8A to 8E for receiving magnetic tape cartridge(s) 10. The magazine 8 is placed on a magazine table 9.

A rail 12 is provided on a tilting table 14. A recorder/reproducer 11 is provided to be moved along the rail 12 as will be described later. The recorder/reproducer 11 is moved along the rail 12 by the driving force applied by a stepping motor 13. A movement mechanism of the recorder/reproducer 11 will be described in detail later.

An optical sensor unit 30 which opposes the recorder/reproducer 11 via the magazine 8 is provided near the lid 3. The optical sensor unit 30 reads barcodes of the magnetic tape cartridges 10 received in the slots 8A to 8E of the magazine 8 when the magazine 8 is inserted through the magazine opening 6.

The magazine table 9 and the tilting table 14 are joined by an arm section 16A which is pivotally supported by a support 15A and an arm section 16B which is pivotally supported by a support 15B and are therefore pivotable in an integrated manner. The arm section 16B is pivoted when the driving force applied by the stepping motor 17 is transferred via the belt mechanism 18. In particular, when the driving force applied by the stepping motor 17 is transferred via the belt mechanism 18, the magazine table 9, the tilting table 14, the magazine 8 placed on the magazine table 9 and the recorder/reproducer 11 are pivoted in an integrated manner. The tape library device 1 also includes a control unit 21 which controls the stepping motors 13 and 17, the optical sensor unit 30 and the recorder/reproducer 11. The tape library device 1 also includes a power supply unit 22 which supplies electric power to these components.

Figure 3:
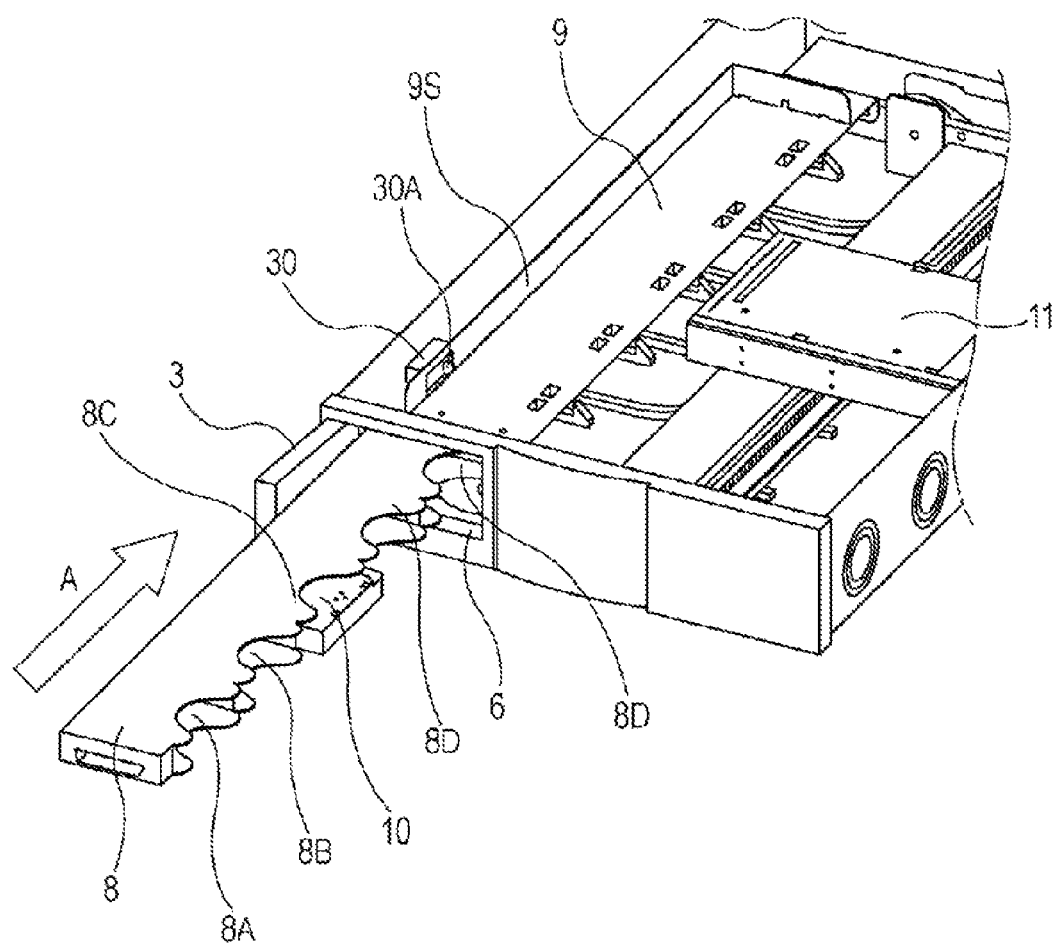
FIG. 3 is a perspective view of a magazine.

The slots 8A to 8E of the magazine 8 are arranged side by side as illustrated in FIG. 3. The magazine 8 is inserted in the magnetic tape library 1 (in the direction of arrow A in FIG. 3) through the magazine opening 6 with the magnetic tape cartridge(s) 10 received therein. The inserted magazine 8 is placed on the magazine table 9 which is a magazine holding unit of the present embodiment.

Figure 4:
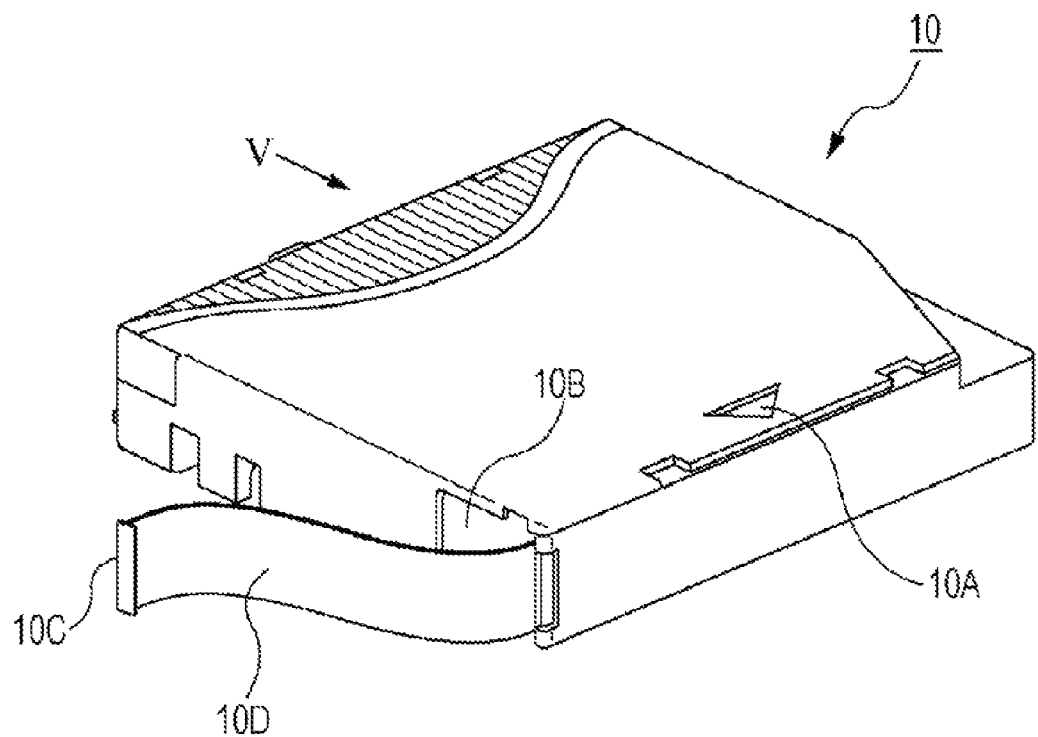
FIG. 4 is a perspective view of a magnetic tape cartridge.

An additional description about the magnetic tape cartridge 10 received in the magazine 8 will be given below. FIG. 4 is a perspective view of the magnetic tape cartridge 10 seen from the side of the recorder/reproducer 11 when the magazine 8 is inserted in the recorder/reproducer 11, i.e., when the magazine 8 is placed on the magazine table 9. As illustrated in FIG. 4, the magnetic tape cartridge 10 is substantially box shaped although with some protrusions and recesses. A mark 10A which indicates a insertion direction into the recorder/reproducer 11 is given on the magnetic tape cartridge 10. Although the mark 10A is used in the present embodiment, other systems capable of indicating the insertion direction may also be employed.

The magnetic cartridge 10 is equipped with a pull-out opening 10B through which a magnetic tape 10D contained in the magnetic cartridge 10 is pulled out. The magnetic tape 10D is taken up and kept under tension which is applied in a direction from the pull-out opening 10B inwardly into the magnetic tape cartridge 10, i.e., a taking-up direction.

Figure 5:
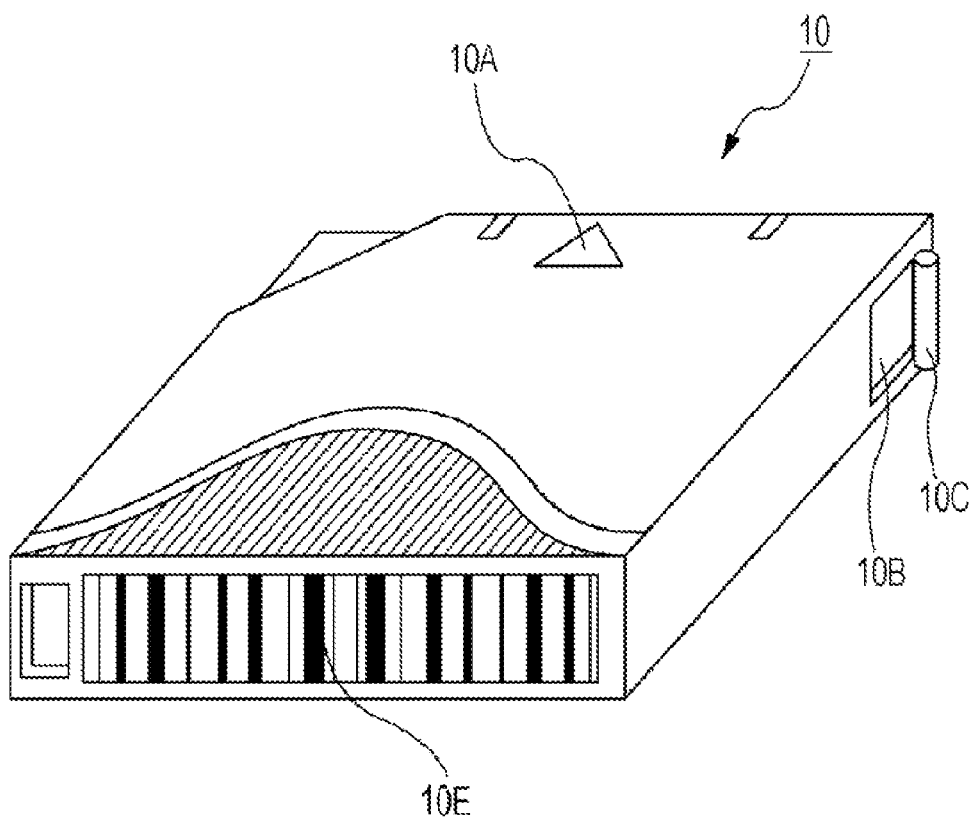
FIG. 5 is a perspective view of the magnetic tape cartridge.

A leading pin 10C is provided at a distal end of the magnetic tape 10D. The recorder/reproducer 11 uses the leading pin 10C when pulling the magnetic tape 10D out of the magnetic tape cartridge 10. The leading pin 10C also prevents the magnetic tape 10D from being trapped inside the magnetic tape cartridge 10 during the take-up and therefore being unable to be pulled out. FIG. 5 is a perspective view of the magnetic tape cartridge 10 seen from the direction of arrow V in FIG. 4. As illustrated in FIG. 5, each of the magnetic tape cartridges 10 includes a barcode 10E which is used for identification on the surface opposite to the surface which faces the recorder/reproducer 11.

Figure 6:
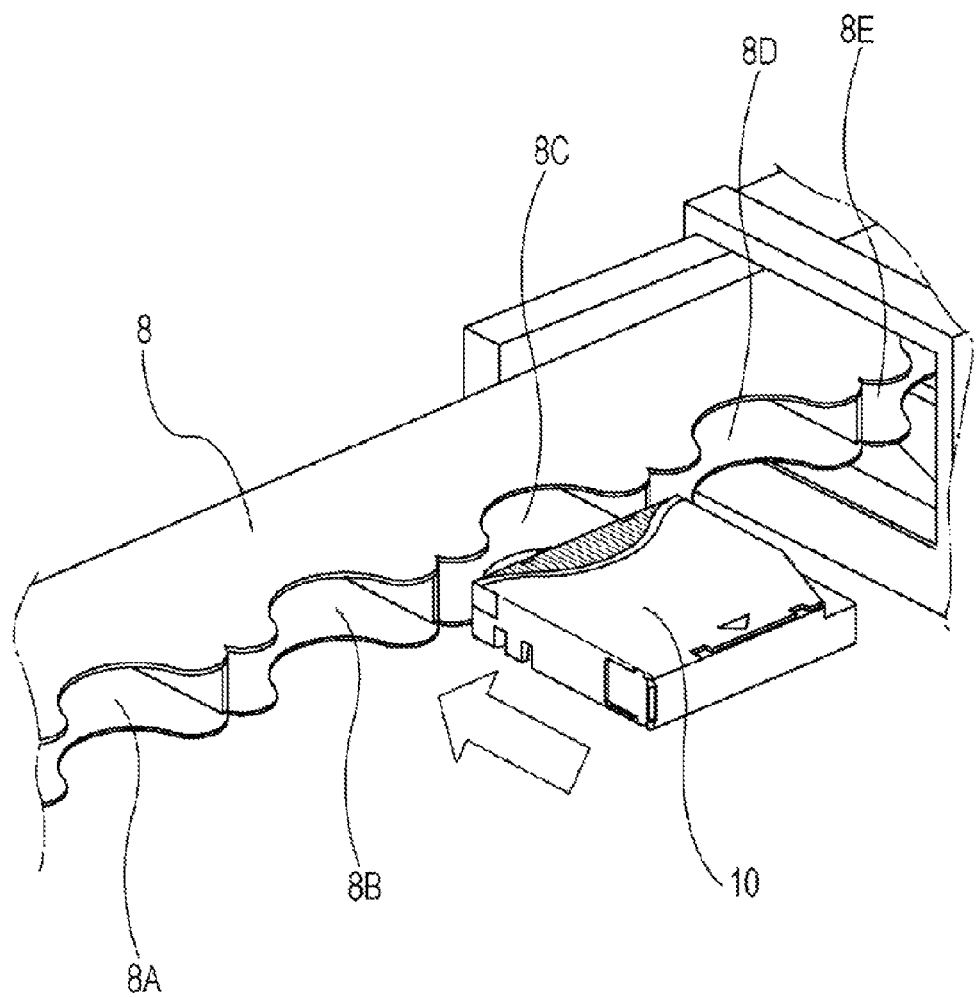
FIG. 6 is a perspective view of the magazine.

In the magnetic tape library device 1 of the present embodiment, the magnetic tape cartridge 10 is received in any of the slots 8A to 8E of the magazine 8 before the magazine 8 is inserted in the magnetic tape library device 1 as illustrated in FIG. 6 (e.g., the magnetic tape cartridge 10 is received in the slot 8C in FIG. 6). The magnetic tape cartridge 10 is received with the surface opposite to the surface provided with the barcode 10E facing the recorder/reproducer 11.

Figure 7:
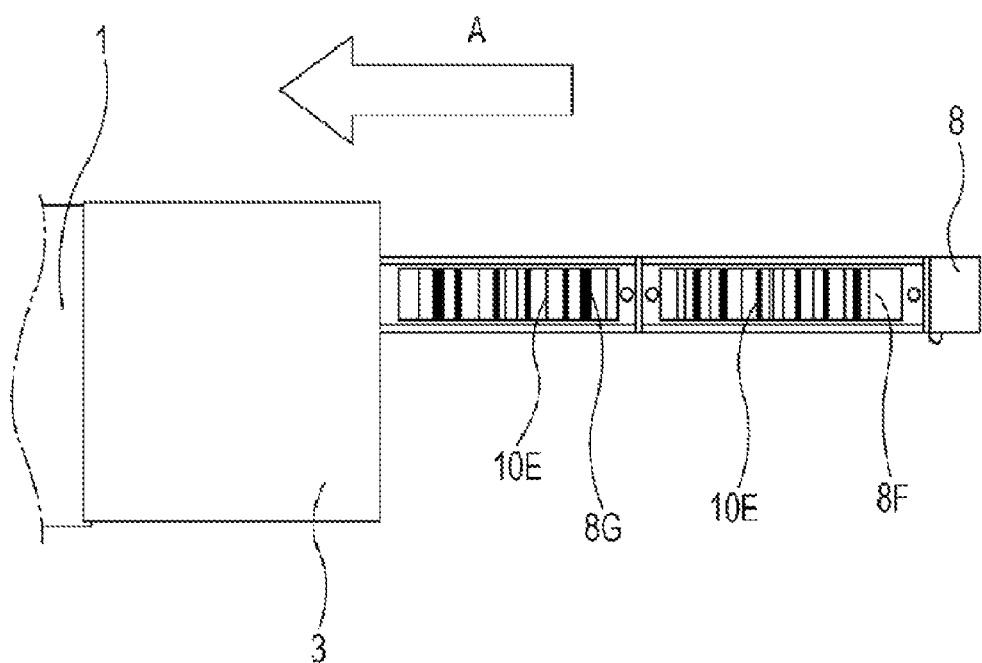
FIG. 7 illustrates barcode windows among barcode windows provided in the magazine.

As illustrated in FIG. 7, the magazine 8 is equipped with barcode windows 8F to 8J through which the barcodes 10E of the slots 8A to 8E can be recognized the barcode windows 8F and 8G are illustrated in FIG. 7; other barcode windows 8H to 8J which are not illustrated have the same structure as those of the barcode windows 8F and 8G).

As described above, the optical sensor unit 30 is provided near the magazine opening 6 of the magazine table 9 and on a surface 9S which faces the barcode windows 8F to 8J of the magazine 8 when the magazine 8 is placed on the magazine table 9. In particular, the optical sensor unit 30 is disposed such that all the barcode windows 8F to 8J pass by the optical sensor unit 30 when the magazine 8 is inserted through the magazine opening 6 to a predetermined position of the magazine table 9. The barcode windows 8F to 8J can be captured as images by an image reading unit 30C incorporated in the optical sensor unit 30. The optical sensor unit 30 is equipped with a roller 30A which is brought into contact with the magazine 8 when the magazine 8 is inserted. The optical sensor unit 30 is also equipped with a pulse unit 30B which produces pulses in response to the rotation of the roller 30A. In accordance with an image detection result by the optical sensor unit 30 and the operation of the control unit 21 which will be described later, the barcode(s) 10E of the magnetic tape cartridge(s) 10 received in the slots 8A to 8E of the magazine 8 can be read as the magazine 8 is inserted through the magazine opening 6.

Figure 8:
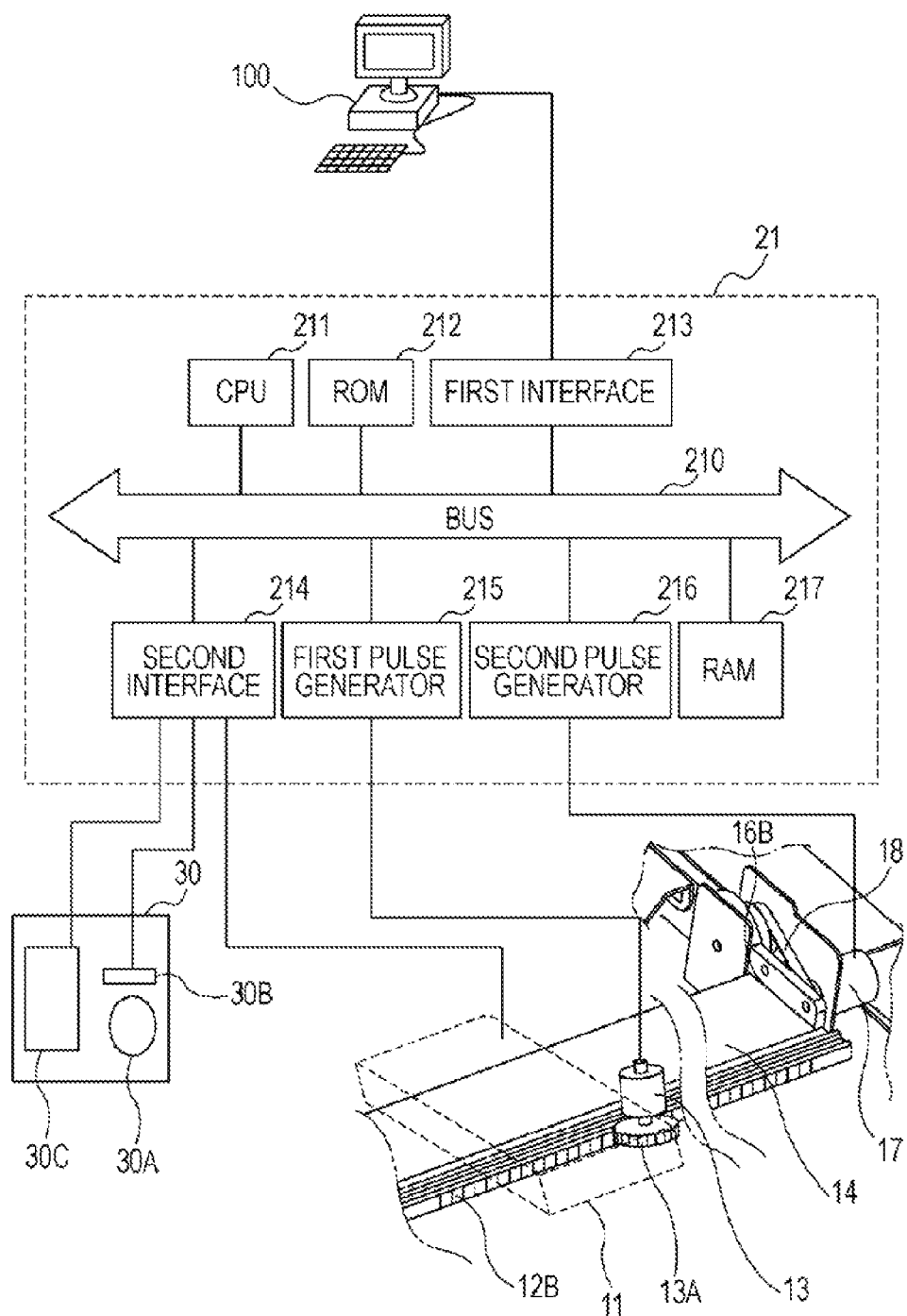
FIG. 8 is a block diagram of the magnetic tape library device.

FIG. 8 is a block diagram of the control unit 21, the recorder/reproducer 11, the stepping motors 13 and 17 and the optical sensor unit 30. It is assumed herein that the magnetic tape library device 1 executes processes in response to requests from a high-order device 100.

The control unit 21 includes a bus 210. The control unit 21 also includes a read-only memory (ROM) 212 in which programs for the control of the magnetic tape library device 1 are stored. Although the programs are stored in the ROM 212 in the present embodiment, the programs may alternatively be stored in other recording media, such as a hard disk device, which are capable of being accessed via the bus 210.

The control unit 21 includes a central processing unit (CPU) 211 which performs control in accordance with the programs stored in the ROM 212. The CPU 211, which is connected to the bus 210, reads the programs from the ROM 212 via the bus 210 and performs control in accordance with the read programs. The control unit 21 includes a first interface 213 for the communication with the high-order device 100. The first interface 213 is connected to the bus 210. The control unit 21 also includes a second interface unit 214 which receives the pulses from the pulse unit 30B and image information from the image reading unit 30C which are in the optical sensor unit 30. The second interface unit 214 communicates with the recorder/reproducer 11. The second interface 214 is connected to the bus 210. The control unit 21 includes a first pulse generator 215 which produces, in response to instructions from the CPU 211, pulses to be sent to the stepping motor 13 provided in the recorder/reproducer 11. The stepping motor 13 rotates in an amount in accordance with pulse counts produced by the first pulse generator 215. A pinion 13A provided on a shaft of the stepping motor 13 meshes with teeth 12B which are arranged linearly along the rail 12. With this structure, the recorder/reproducer 11 is moved along the rail 12 by an amount in accordance with the pulse counts. The first pulse generator 215 can apply reverse voltage for the pulses (i.e., positive and negative voltages) and thereby change the rotational direction of the stepping motor 13. A rotation of the stepping motor 13 in a reverse direction moves the recorder/reproducer 11 in a different direction.

The control unit 21 includes a second pulse generator 216 which produces pulses to be sent to the stepping motor 17 in response to instructions from the CPU 211. The stepping motor 17 rotates by an amount in accordance with the pulse counts of the second pulse generator 214. As described above, when the stepping motor 17 is rotated, the arm section 16B is pivoted via the belt mechanism 18. With this structure, the tilting table 14, the magazine table 9 and other components integrated with the arm section 16B are moved. The second pulse generator 216 can apply reverse voltage for the pulses (i.e., positive and negative voltages) and thereby change the rotational direction of the stepping motor 17. A rotation of the stepping motor 17 in the reverse direction changes the pivotal direction of the arm section 16B, whereby the tilting table 14 and the magazine table 9 integrated with the arm section 16B are moved in a different direction.

The control unit 21 includes a RAM 217 in which various types of information is stored.

Figure 9:
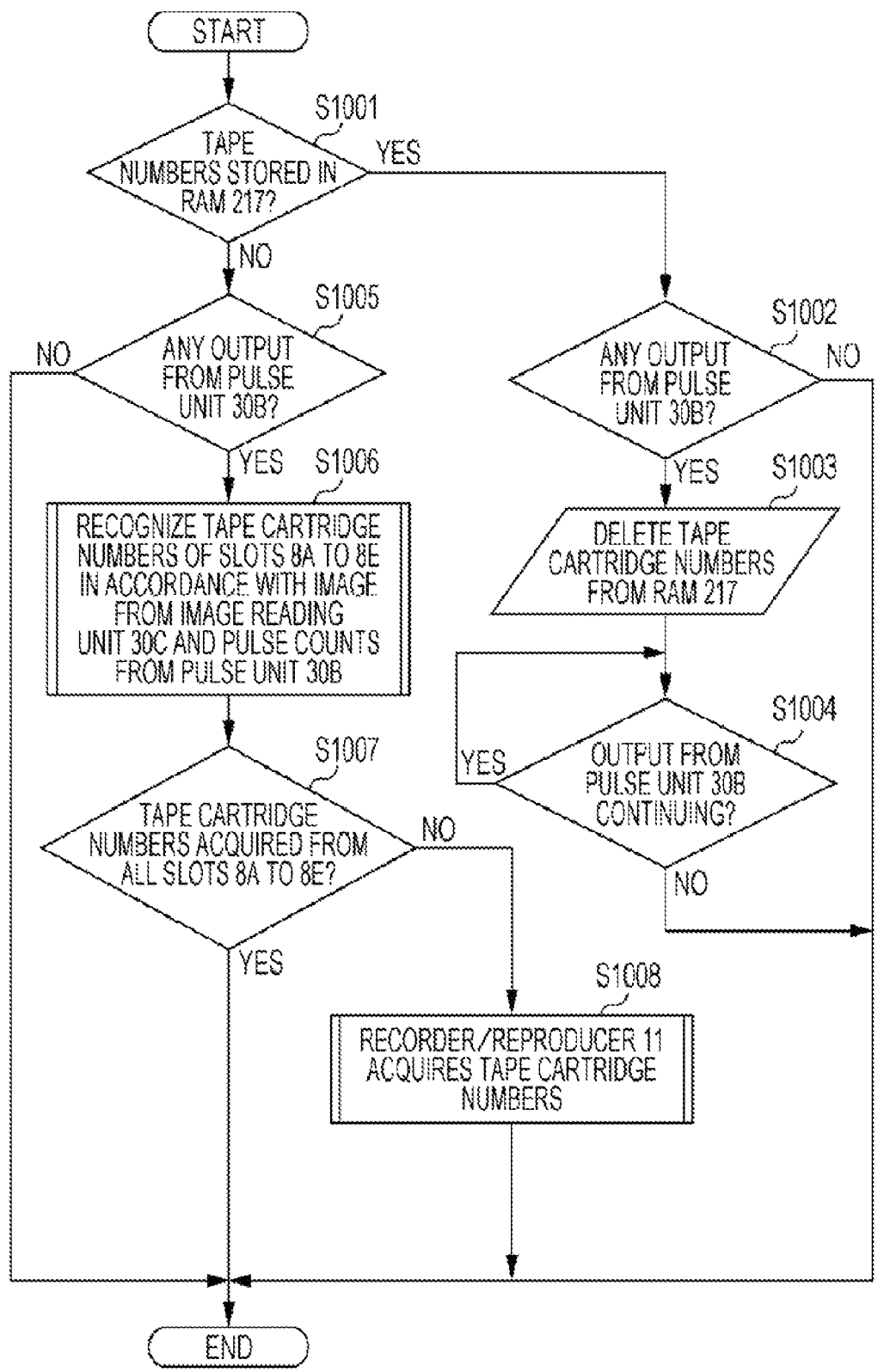
FIG. 9 is a flowchart of a procedure for inserting the magazine.

Hereinafter, an operation for the insertion of the magazine 8 in the thus-structured magnetic tape library device 1 of the present embodiment will be described with reference to the flowchart of FIG. 9.

In the present embodiment, it is assumed that this process is executed by periodically interrupting other processes. First, the CPU 211 checks whether any tape cartridge number(s) are stored in the RAM 17 (S1001). The tape cartridge numbers indicate which one of the magnetic tape cartridges is received in the slots 8A to 8E of the magazine 8 inserted in the magnetic tape library device 1.

If the tape cartridge numbers are stored in the RAM 217, the CPU 211 checks whether there is an output from the pulse unit 30B of the optical sensor unit 30 (S1002). If the check result is negative, the CPU 211 completes this process. If any tape cartridge number(s) is stored in the RAM 217, it is indicated that the magazine 8 is present in the magnetic tape library device 1. If the optical sensor unit 30 detects nothing, it is indicated that no magazine 8 is currently being inserted or ejected and that the magazine 8 is already inserted and there is no attempt to eject the same. The magazine 8 is not currently being inserted or ejected if the check result in S1002 is negative, then the CPU 211 completes the process.

In the present embodiment, existence of the magnetic tape cartridge 10 in the magnetic tape library device 1 is determined by checking whether the tape cartridge number(s) are stored in the RAM 17. The roller 30A is in contact with the magazine 8 as described above. The roller 30A thus rotates when the magazine 8 is moved in the insertion direction or the direction opposite thereto. Since the pulse unit 30B produces pulses in response to the rotation of the roller 30A as described above, existence of the output from the pulse unit 30B indicates that a movement of the magazine 8 in the insertion direction or the direction opposite thereto is currently being detected.

Thus, if the check result in S1002 is negative, it is indicated that the magazine 8 is not currently being moved in the insertion direction or the direction opposite thereto, and is still inserted in the magnetic tape library device 1. In this case, no more detection of the insertion is performed and the process is completed.

If, on the other hand, the check result in S1002 is affirmative, it is indicated that the magazine 8, which has been inserted in the magnetic tape library device 1, is being moved in the insertion direction or the direction opposite thereto. This state indicates that the magazine 8 is being ejected from the magnetic tape library device 1 by a user. Since the magnetic tape cartridge is being ejected from the magnetic tape library 1, the tape cartridge number(s) stored in the RAM 217 will be deleted. Thus, if the check result in S1002 is affirmative, the CPU 211 completely deletes the tape cartridge information from the RAM 217 (S1003).

The CPU 217 stands by until the output from the pulse unit 30B stops and then completes this process (S1004).

If it is determined in S1001 that the tape cartridge number(s) are not stored in the RAM 217, the CPU 211 checks whether there is an output from the pulse unit 30B (S1005). If the check result is negative, the CPU 211 completes this process.

If the check result in S1005 is affirmative, the CPU 211 acquires image information from the image reading unit 30C. The CPU 211 counts the pulses output from the pulse unit 30B. The CPU 211 then recognizes the barcodes 10E through the window frames 8F to 8J of the slots 8A to 8E on the basis of the acquired image information and the pulse counts. The tape cartridge numbers are acquired from the read barcodes 10E and are stored in the RAM 217 in correlation with the slots in which the cartridges 10 are received (S1006).

The process of S1005 is executed when the CPU 211 determined in S1001 that the tape cartridge numbers are not stored in the RAM 217. As described above, the tape cartridge numbers are deleted from the RAM 217 as the magazine 8 is ejected from the magnetic tape library device 1 in the processes of S1002 to S1004. Therefore, as described above, the process of S1005 is executed when the magazine 8 is not inserted in the magnetic tape library device 1. Thus, if the pulses output from the pulse unit 30B are detected in this state, it is indicated that the magazine 8 is currently being inserted in the magnetic tape library 1. The slots 8A to 8E of the magazine 8 which is travelling pass by the optical sensor unit 30. The pulses are output from the pulse unit 30B in accordance with the travel distance of the magazine 8 as described above. Thus, the pulse counts indicate the travel distance of the magazine 8. The pulse counts also indicate that which one of the barcodes 10E of the magnetic tape cartridges 10 received in the slots 8A to 8E of the magazine 8 is being read. A correspondence table of the pulse counts and the magazine location is stored in the ROM 212. The CPU 211 sequentially reads the identification barcodes 10E provided in the magnetic tape cartridges 10 received in the slots 8A to 8E through the recognition of the image information acquired via the second interface 214 in S1006 in accordance with the correspondence table. The pulse information is also used as location information for the recognition of the barcodes 10E themselves to be read in addition to the identification of the slots 8A to 8E.

After the process of S1006 is completed, the CPU 211 checks whether the tape cartridge numbers of the magnetic tape cartridges 10 in all the slots 8A to 8E have been acquired in S1006 (S1007).

If the check result in S1007 is negative, it is indicated that the barcode(s) 10E have not been able to be read because, for example, no magnetic cartridge 10 has been received in any of the slots 8A to 8E or any of the magnetic cartridges 10 has no barcode 10E.

FIG. 10 is a table 2170 of the recognition result by the CPU 211 in S1006. It is assumed that the CPU 211 has caused the table 2170 to be stored in the RAM 217 in the process of S1006.

In the table 2170, the slots with corresponding tape cartridge numbers (i.e., the slots 8B, 8C and 8E) have been able to be recognized with the barcodes 10E and of which tape cartridge numbers have been acquired. However, the slots 8A and 8C are each provided with a code "ERR," which indicates that their tape cartridge numbers have not been acquired by the CPU 211 in S1006.

In this state, the CPU 211 acquires the tape cartridge numbers for the slots (8A and 8C) to which "ERR" has been given by controlling the magnetic recorder/reproducer 11. This process is performed by controlling the movement of the recorder/reproducer 11 by the stepping motor 13 and controlling the insertion and ejection of the magnetic tape cartridge 10 to and from the recorder/reproducer 11 which is driven by the stepping motor 17. This process will be described in detail later. The table 2170 updated in S1008 is given in FIG. 11. In the table 2170 of FIG. 11, the slot 8A is an example for which a new magnetic tape cartridge number was acquired by the process and the tape cartridge number is updated from "ERR" to "3511." Since existence of the magnetic tape cartridge 10 in the slot 8D was not recognized by the recorder/reproducer 11, the magnetic tape cartridge number is updated to "NONE" which is given for the distinction from "ERR" and indicates absence of the magnetic tape cartridge 10.

When the tape cartridge numbers for all the slots 8A to 8E are acquired in S1007 or the process of S1007 is completed, this process is completed.

As described above, according to the present embodiment, it is possible to identify, at the time of inserting of the magazine 8, the identification barcodes 10E provided on the surfaces opposite to the surfaces on which the magnetic tape cartridges 10 are inserted in the recorder/reproducer 11. As described above, a magnetic tape cartridge used in a separated magnetic tape library device often includes an identification barcode provided on a surface opposite to the surface on which the magnetic tape cartridge is inserted in the recorder/reproducer 11. Such a magnetic tape cartridge can also be used in the integrated magnetic tape library device of the present embodiment.

Next, a mechanism and control for inserting and ejecting the magnetic tape cartridge 10 contained in the magazine 8 in and from the recorder/reproducer 11 in the magnetic tape library device 1 of the present embodiment will be described.

As described above, the magnetic tape library device 1 includes the recorder/reproducer 11 which reads information from and writes information to a magnetic tape in the magnetic tape cartridge 10 received in the magazine 8.

Figure 12:
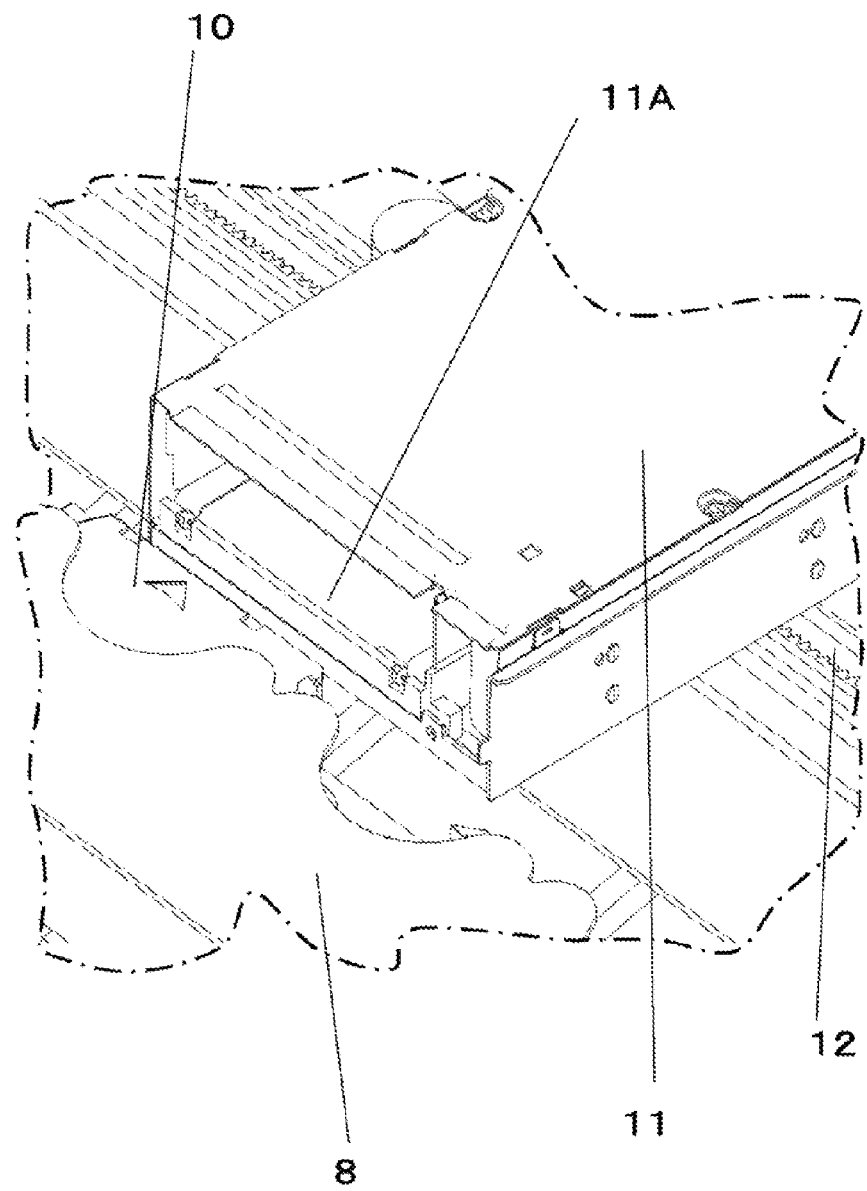
FIG. 12 is a perspective view of a section near a cartridge opening of a recorder/reproducer.

As illustrated in FIG. 12, the recorder/reproducer 11 includes a cartridge opening 11A on a surface which faces the magnetic tape cartridges 10. When one of the magnetic tape cartridges 10 is inserted through the cartridge opening 11A, an automatic inserting mechanism of the recorder/reproducer 11 draws the magnetic tape cartridge 10 into a predetermined position and the recorder/reproducer 11 starts recording and reproduction.

Figure 13:
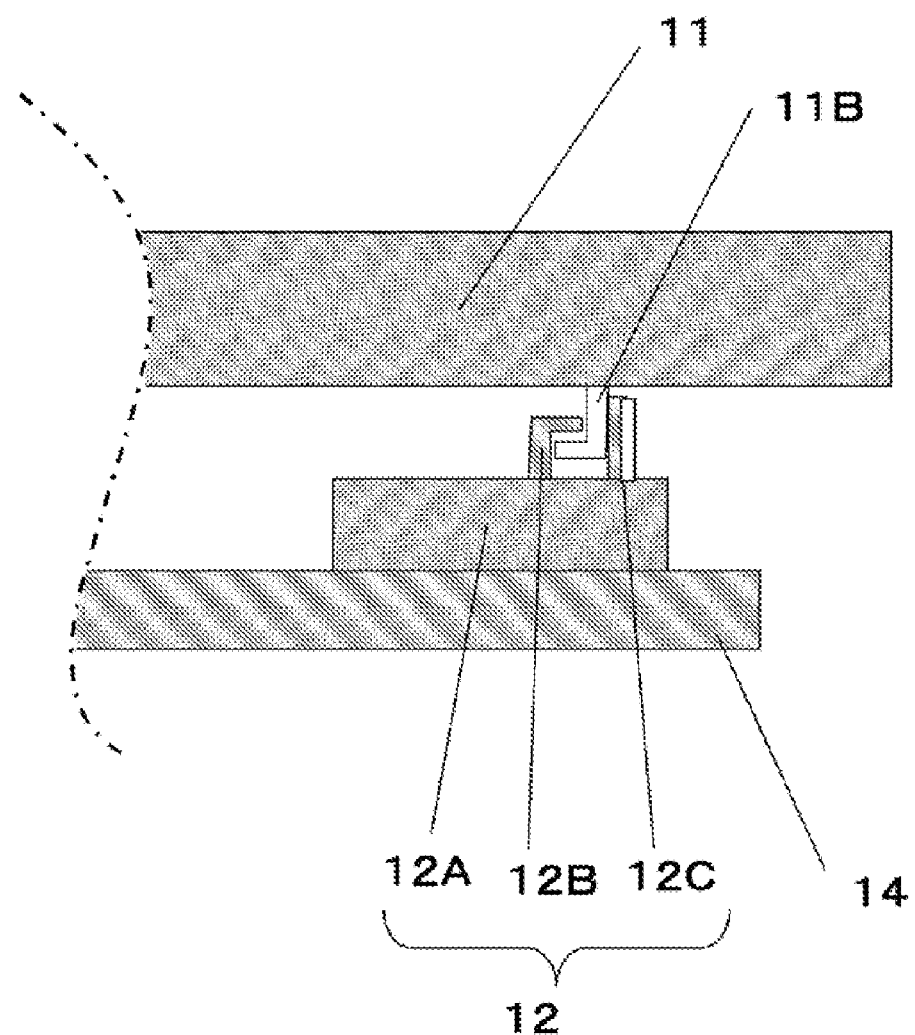
FIG. 13 is a sectional view of the recorder/reproducer.

The recorder/reproducer 11 is attached to the rail 12 provided in parallel with the slots 8A to 8E of the magazine 8 and is therefore movable along the rail 12. Attachment of the recorder/reproducer 11 to the rail 12 will be described with reference to a sectional view of FIG. 13. FIG. 13 is a sectional view of the magnetic tape library device 1 taken along line C-C' in FIG. 2.

As illustrated in FIG. 13, the recorder/reproducer 11 includes a claw 11B at a lower portion thereof. In the present embodiment, a plurality of claws 11B are provided along the rail 12. The rail 12 includes a rail mount 12A provided in parallel with the slots 8A to 8E of the magazine 8. On the rail mount 12A, a first rail 12B for the engagement with the claws 11B is provided in parallel with the slots 8A to 8E of the magazine 8. A second rail 12C is provided in parallel with the first rail 12B via the claws 11B. With these claws 11B, the first rail 12B and the second rail 12C, the recorder/reproducer 11 can be moved along the rail 12 without departing from the rail 12.

Figure 14:
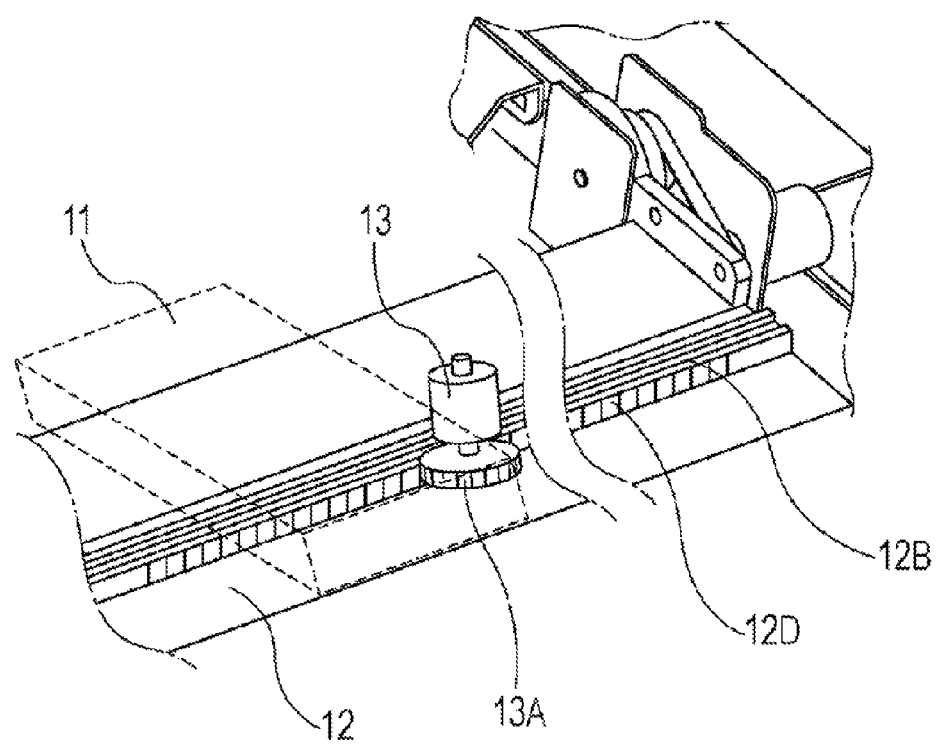
FIG. 14 illustrates a rail.

As illustrated in FIG. 14, teeth 12D are formed linearly on a surface of the second rail 12C. The stepping motor 13 provided in the recorder/reproducer 11 includes a pinion 13A which engages the teeth. With this structure, as the stepping motor 13 rotates, the recorder/reproducer 11 is moved along the rail 12. Thus, the moving direction of the recorder/reproducer 11 is determined by the rotational direction of the stepping motor 13. (For the convenience of the illustration, the recorder/reproducer 11 is illustrated as a perspective view in FIG. 14.)

Figure 15:
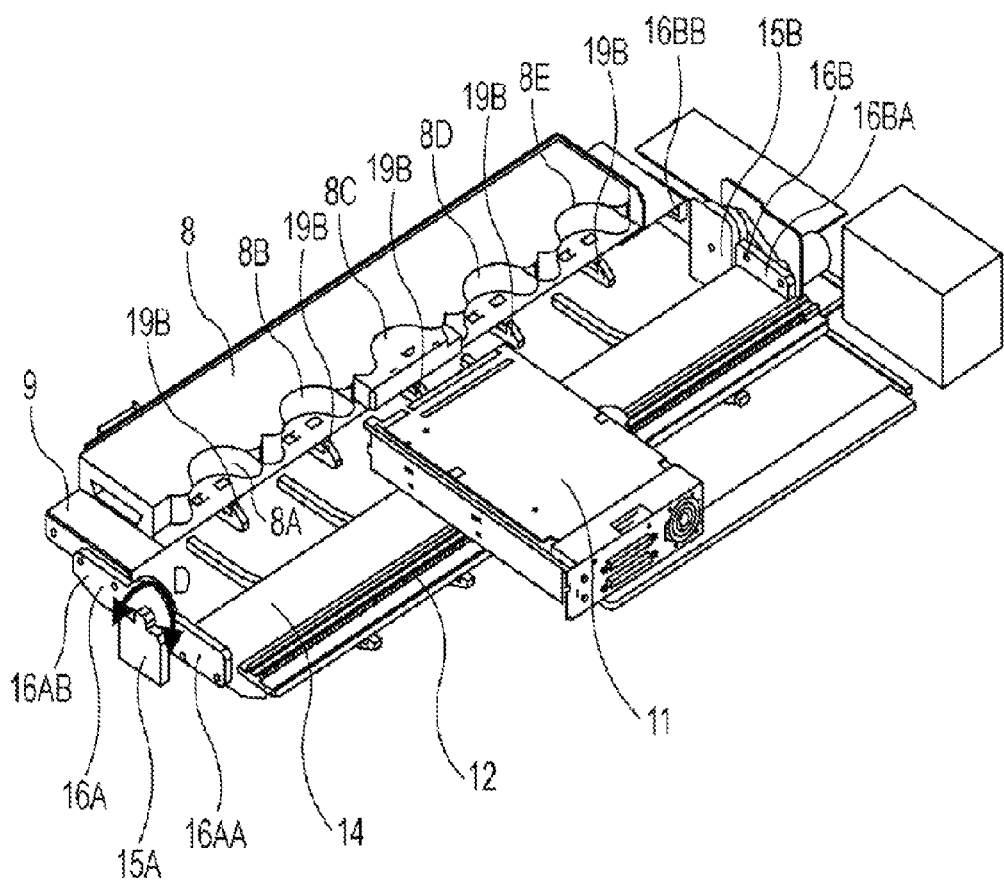
FIG. 15 illustrates a tilt mechanism.

The rail 12 is provided on the tilting table 14. As illustrated in FIG. 15, one end of the tilting table 14 is coupled to a first end 16AA of the arm section 16A which is pivotable in the direction of arrow D about the support 15A. Similarly, the other end of the tilting table 14 is coupled to a first end 16BA of the arm section 16B which is pivotable in the direction of arrow D about the support 15B. A second end 16AB of the arm section 16A and a second end 16BB of the arm 16B are coupled to the magazine table 9. With this structure, the magazine table 9 and the tilting table 14 can be pivoted in the direction of arrow D in an integrated manner. Thus, the magazine 8 placed on the magazine table 9 and the recorder/reproducer 11 placed on the tilting table 14 can also be pivoted in the direction of arrow D in an integrated manner. Second arms 19 are provided for stopping the cartridges 10, which will be described in detail later.

Figure 16:
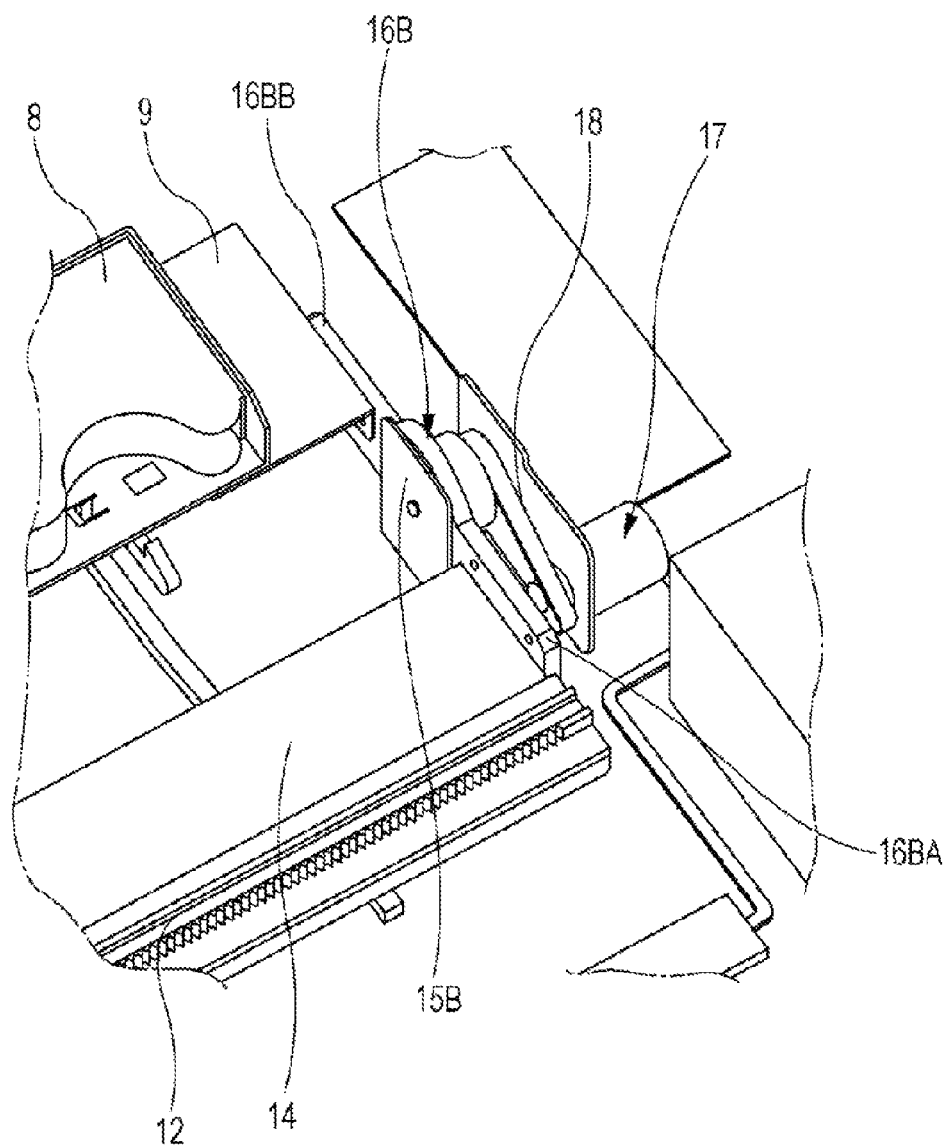
FIG. 16 is a perspective view of a stepping motor and a belt mechanism.

As illustrated in FIG. 16, a shaft of the support 15B is coupled to the stepping motor 17 via the belt mechanism 18.

In the thus-structured magnetic tape library device 1 of the present embodiment, the magazine 8 and the recorder/reproducer 11 can be tilted in an integrated manner as the stepping motor 17 rotates.

It has been described that the recorder/reproducer 11 includes the cartridge opening 11A on the surface which faces the magazine 8. The cartridge opening 11A and the magnetic tape cartridges 10 received in the magazine 8 are of the same height when the magazine 8 is placed on a predetermined position of the magazine table 9.

Figure 17:
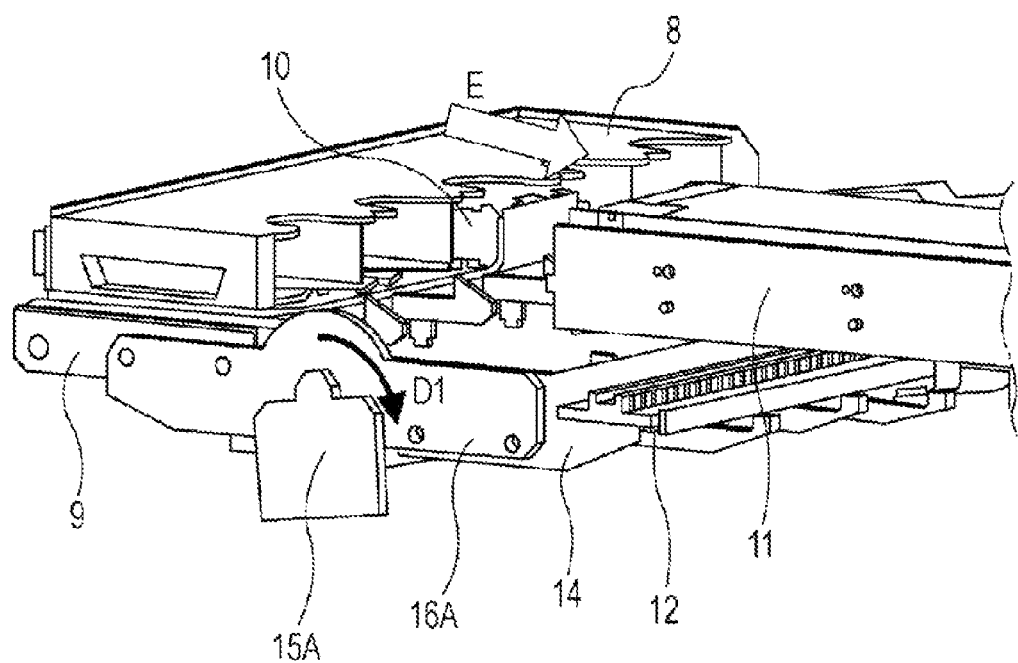
FIG. 17 illustrates a positional relationship of the magazine and the recorder/reproducer.

In this state in which the magazine 8 having the magnetic tape cartridges 10 received therein is placed on the magazine table 9, the recorder/reproducer 11 is first moved to face one of the magnetic tape cartridges 10 as illustrated in FIG. 17. When the recorder/reproducer 11 is tilted in the direction of arrow D1 from this state, the magnetic tape cartridge 10 starts sliding in the direction of arrow E unless any obstacle is present, and is inserted through the cartridge opening 11A of the recorder/reproducer 11.

This means that the magnetic tape cartridge 10 can be inserted in the recorder/reproducer 11 by simply tilting the recorder/reproducer 11 in the direction of arrow D1.

However, in a structure in which the magnetic tape cartridges 10 are to be slid out of the magazine 8 when the recorder/reproducer 11 is tilted, the magnetic tape cartridges 10 which do not face the recorder/reproducer 11 slide down and drop from the magazine 8. The magnetic tape library device 1 of the present embodiment is equipped with a mechanism for preventing this phenomenon. Hereinafter, the mechanism will be described with reference to FIG. 18 and subsequent figures.

Figure 18:
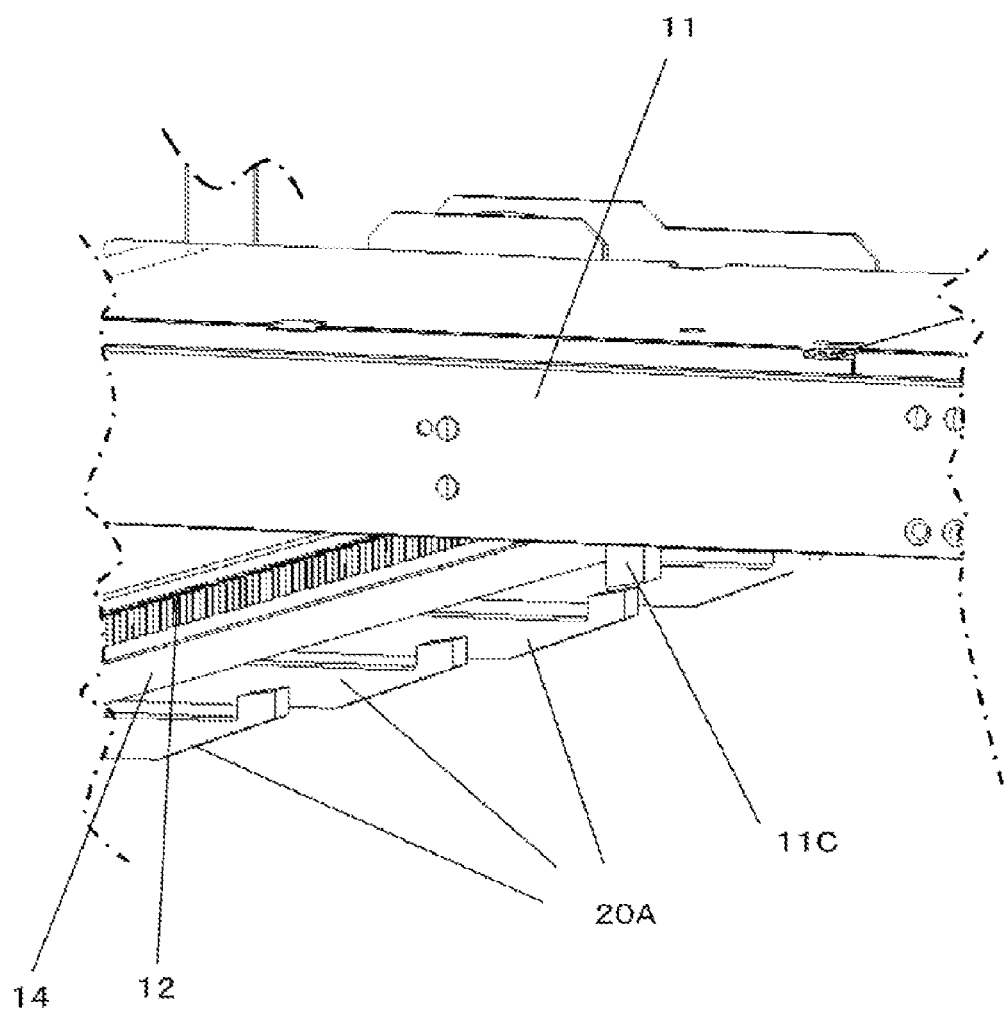
FIG. 18 is a side view of the recorder/reproducer.
Figure 19:
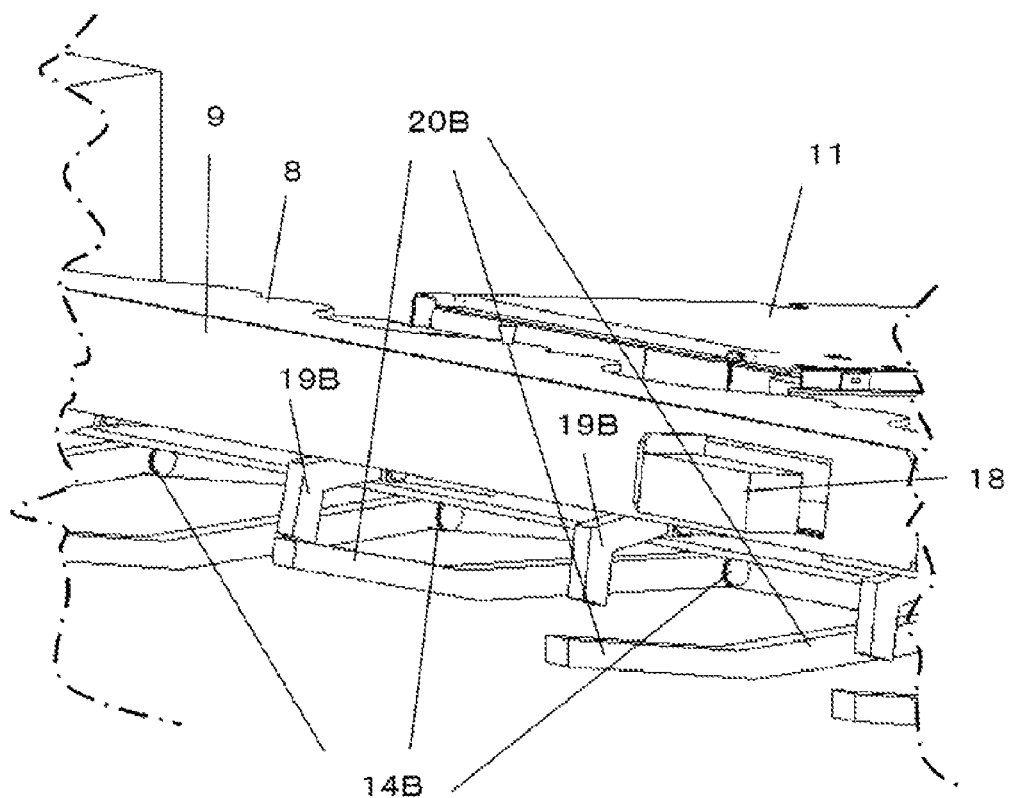
FIG. 19 is a fragmentary perspective view of the magnetic tape library device.

FIG. 18 is a side view of the recorder/reproducer 11 seen from the direction of arrow F in FIG. 2. As illustrated in FIG. 18, the recorder/reproducer 11 includes a protrusion 11C at a lower portion thereof. First arms 20 are pivotally provided at a lower portion of the tilting table 14. First ends 20A of the first arms 20 protrude from the lower portion of the tilting table 14. The first arms 20 are provided at positions corresponding to the slots 8A to 8E of the magazine 8. As illustrated in FIG. 19, second ends 20B of the first arms 20 extend over the magazine table 9. (FIG. 19 is a fragmentary perspective view of the magnetic tape library device 1 seen from the direction of arrow G in FIG. 2. The lower housing 7 is illustrated as a perspective view for the convenience of the illustration.)

As illustrated in FIG. 19, pivoting joints 14B, which pivotally support the first arms 20 on the tilting table 14, are provided at a lower portion of the tilting table 14.

The second arms 19 are pivotally supported at the lower portion of the magazine table 9 and include first ends 19B. The second ends 20B of the first arms 20 can pivot to abut corresponding second ends 19B of the second arms 19. The pivotal direction of the second arms 19 is the same as the pivotal direction of the first arms 20. As illustrated in FIG. 15, the first ends 19A of the second arms 19 protrude from the lower portion of the magazine table 9 toward the tilting table 14. The tips of the first ends 19A of the second arms 19 are formed as hooks 19C. The hooks 19C are located between the magnetic tape cartridges 10 received in the slots 8A to 8E of the magazine 8 and the recorder/reproducer 11.

Here, operations of the protrusion 11C, the first arms 20 and the second arms 19 will be described.

Figure 20A:
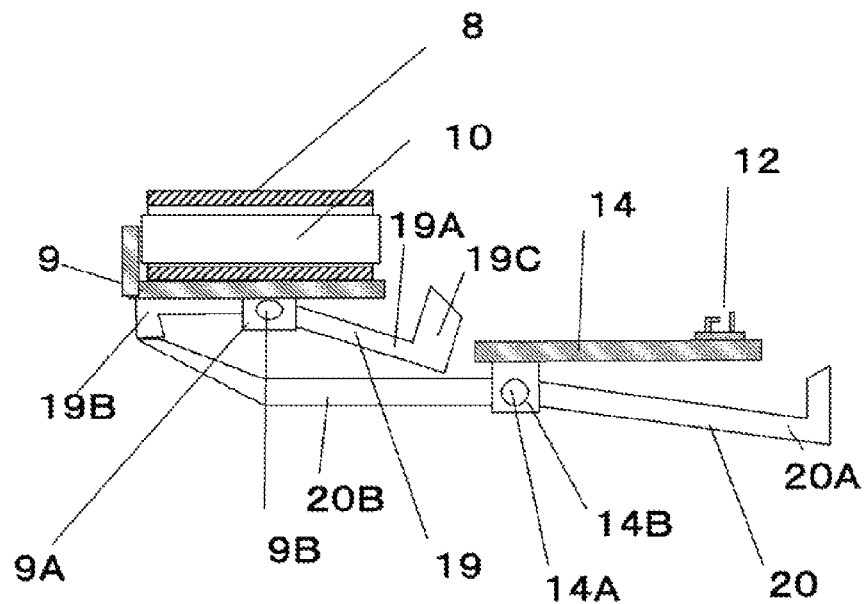
FIGS. 20A and 20B are sectional views of the magnetic tape library device.

FIG. 20A is a sectional view of the magnetic tape library device 1 taken along line H-H' in the perspective view of FIG. 2.

FIG. 20A is a sectional view illustrating a state in which the tilting table 14 is in a horizontal position. In this state, the magazine table 9, which is pivoted integrally with the tilting table 14 as described above, is also in the horizontal position.

As described above, the second arm 19 is supported at the lower portion of the magazine table 9 to be pivotable about a support point 9B of a support 9A. As is apparent from FIG. 20A, the position of the second arm 19 is adjusted such that when its second end 19B is in the horizontal position, the first end 19A is tilted slightly downward. The hook 19C is provided so as not to interfere with the insertion and ejection of the magnetic tape cartridges 10 when the second arm 19 is in the horizontal position.

As described above, the first arm 20 is provided at the lower portion of the tilting table 14 to be pivotable about the support point 14B of the support 14A. The first end 20A of the first arm 20 is also formed to extend slightly downward.

Weight distribution of the first arm 20 and the second arms 19 is adjusted such that the state illustrated in FIG. 20A is kept in the horizontal position.

In the state illustrated in FIG. 20A, the magnetic tape cartridges 10 received in the magazine 8 are also in the horizontal position and thus would not slide out of the magazine 8.

Figure 20B:
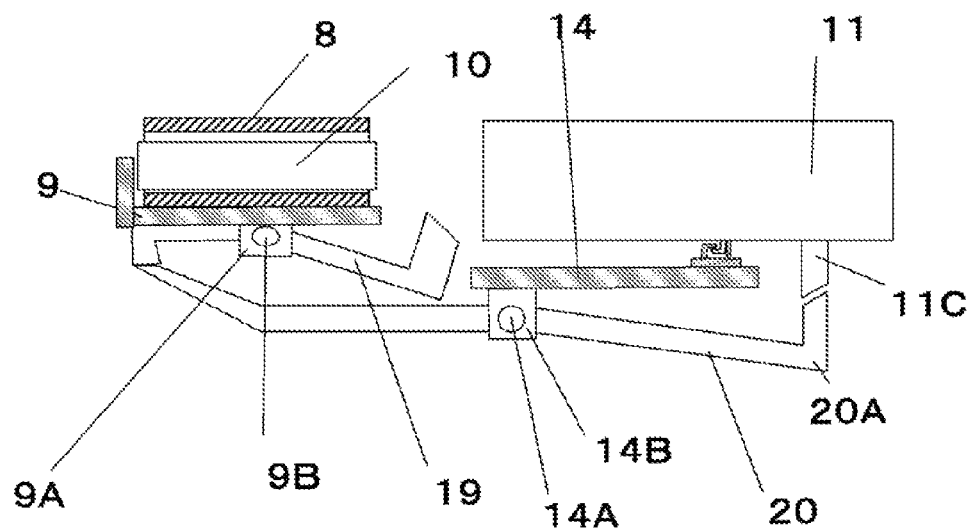

FIG. 20B illustrates a state in which, in the horizontal position of FIG. 20A, the recorder/reproducer 11 has been moved to face a magnetic tape cartridge 10. As is apparent from FIG. 20B, the length of the protrusion 11C of the recorder/reproducer 11 is determined not to interfere with the first end 20A of the first arm 20 in the horizontal position.

This means that, in the horizontal position, the recorder/reproducer 11 can be moved along the rail 12 without any interference from the first arm 20.

Next, an operation in which the tilting table 14 is tilted to the direction of arrow D1 illustrated in FIG. 17 due to, for example, the rotation of the stepping motor 17 will be described with reference to FIGS. 21A and 21B.

Figure 21A:
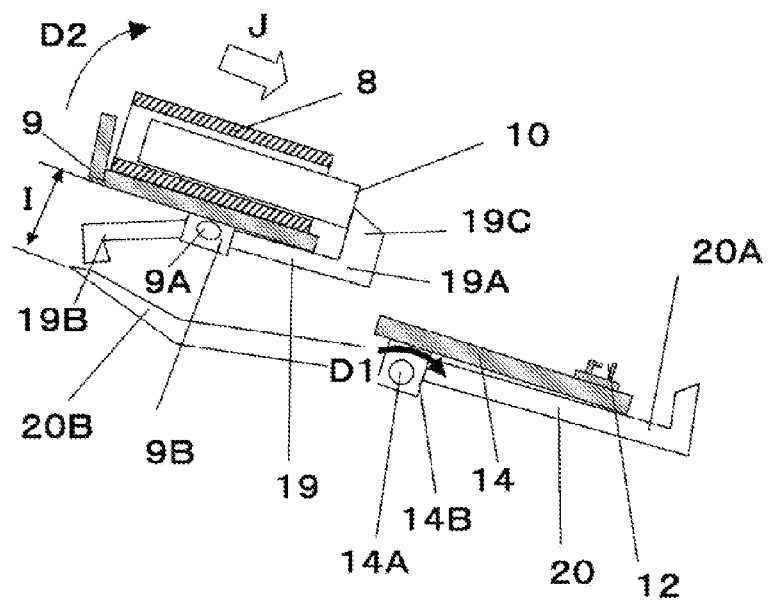
FIGS. 21A and 21B are sectional views of the magnetic tape library device.
Figure 21B:
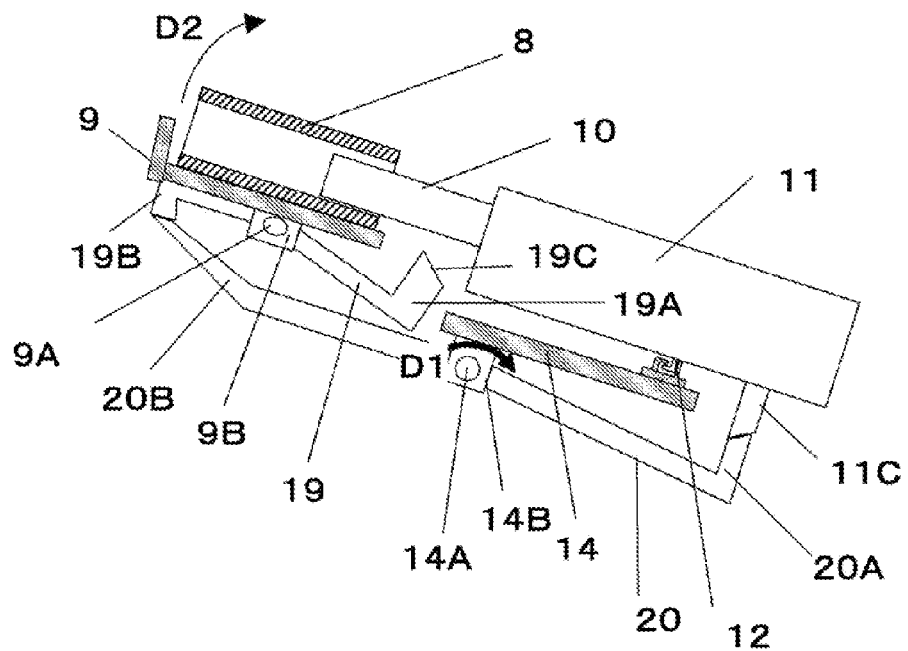

FIG. 21A is a sectional view illustrating a state in which one of the magnetic tape cartridges 10 received in the magazine 8 is not faced by the recorder/reproducer 11 when the tilting table 14 is tilted in the direction of arrow D1. (FIG. 21A is a sectional view taken along line H-H' similar to those in FIGS. 20A and 20B.) As is apparent from FIG. 21A, when the tilting table 14 is tilted in the direction of arrow D1 from the horizontal state, the magazine table 9 is pivoted in the direction of arrow D2. The first arm 20 does not follow the pivotation of the tilting table 14 until the tilting table 14 is tilted to a certain angle. This is because the first arm 20 is supported by the tilting table 14 in a pivotable manner and the first end 20A thereof is tilted downward, whereby the first arm 20 does not abut a lower end of the tilting table 14 until the tilting table 14 is tilted to a certain angle. Thus, the shortest distance I between the second end 20B of the first arm 20 and the lower surface of the magazine table 9 is longer than that in the horizontal position illustrated in FIG. 20.

Since the first end 19A of the second arm 19 is also tilted downward and the shortest distance I between the second end 20B of the first arm 20 and the lower surface of the magazine table 9 is longer than that in the horizontal position, interference by the second end 20B of the first arm 20 can be avoided. With this structure, when the magazine table 9 is tilted to a certain angle, the first end 19A of the second arm 19 abuts the lower surface of the magazine table 9. As described above, the tips of the first end 19A of the second arm 19 is formed as the hook 19C. When the first end 19A abuts the lower surface of the magazine table 9, the hook 19C is made to interfere with the magnetic tape cartridge 10 in the direction in which the magnetic tape cartridge 10 is inserted and ejected.

In the tilted state illustrated in FIG. 21A, although the magnetic tape cartridge 10 starts sliding in the direction of arrow J, the sliding movement is restricted by one of the hook 19C.

Next, an operation in a case in which one of the magnetic tape cartridges 10 received in the magazine 8 is faced by the recorder/reproducer 11 in the same tilted state as in FIG. 21A will be described.

Since the protrusion 11C provided in the lower portion of the recorder/reproducer 11 abuts the first end 20A of the first arm 20 in this state, rotation of the first arm 20 about the support point 14B is restricted. Thus, the positional relationship of the tilting table 14 and the magazine table 9 with the first arm 20 is not changed. As described above, the second end 20B of the first arm 20 abuts the first end 19B of the second arm 19 in the horizontal position. Thus, pivotation of the second arm 19 about the support point 9B is restricted. Thus, the positional relationship of the tilting table 14 and the magazine table 9 with the second arm 19 is not changed from that in the horizontal position. As described above, in the horizontal position, the hook 19C does not interfere with the magnetic tape cartridge 10 in the direction in which the magnetic tape cartridge 10 is inserted and ejected. Thus, the magnetic tape cartridge 10 starts sliding in the direction of arrow J without any interference by the hook 19C. The magnetic tape cartridge 10 is inserted through the cartridge opening 11A of the recorder/reproducer 11, which is disposed in the direction of arrow J.

Figure 22:
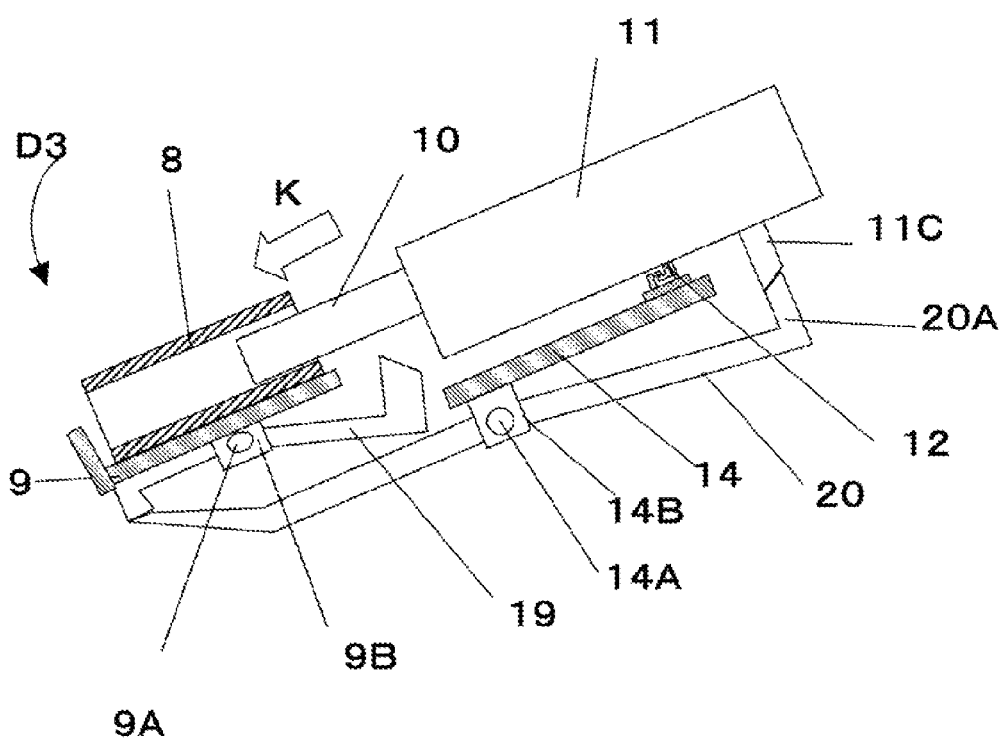
FIG. 22 is a sectional view of the magnetic tape library device.
Figure 23:
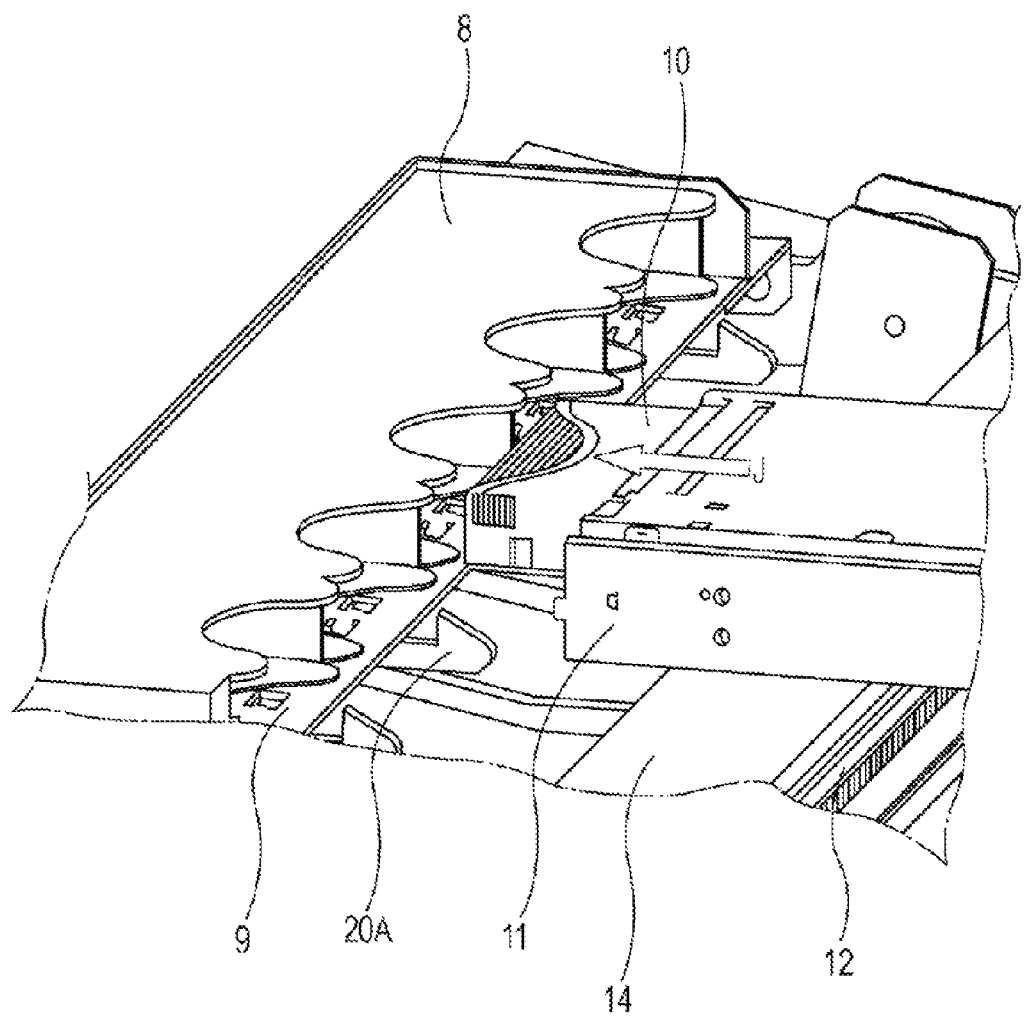
FIG. 23 is a perspective view of a section near the cartridge opening of the recorder/reproducer.

When the magnetic tape cartridge 10 is returned from the recorder/reproducer 11 to the magazine 8, the magazine table 9 and the tilting table 14 are tilted in the direction (D3) which is opposite to the direction D2 as illustrated in FIG. 22. As described with reference to FIG. 21, since the pivotation of the first arm 20 and the second arm 19 about the support points 9B and 14B is restricted by the protrusion 11C of the recorder/reproducer 11, the hook 19C does not interfere with the magnetic tape cartridge 10 in the direction in which the magnetic tape cartridge 10 is inserted and ejected. Thus, the magnetic tape cartridge 10 starts sliding in the direction of arrow K and is returned from the recorder/reproducer 11 to the magazine 8. The operation illustrated in FIG. 22 is also illustrated in FIG. 23 as a perspective view.

Figure 24:
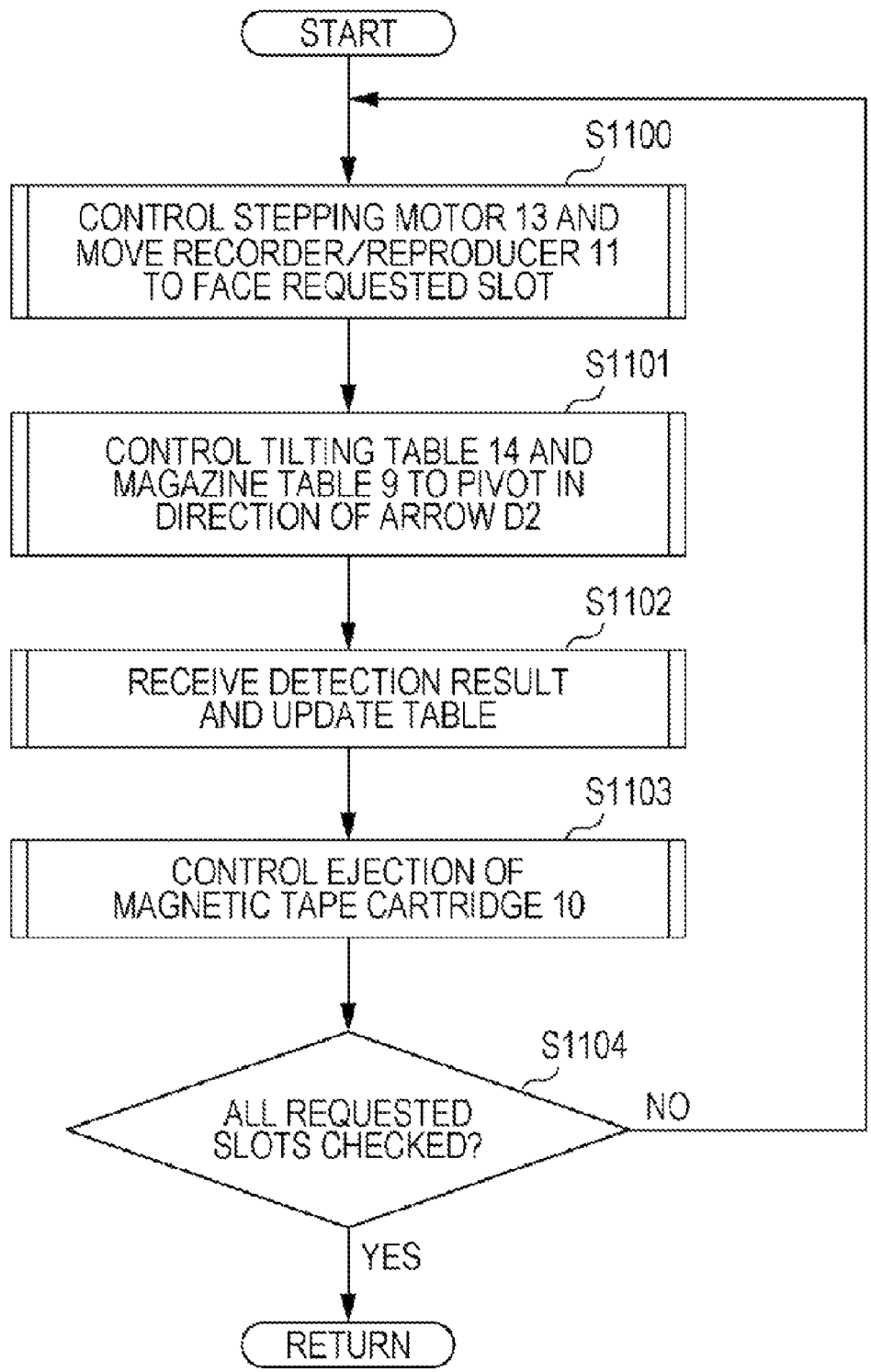
FIG. 24 is a flowchart of a procedure for inserting the magazine.

Next, the process of S1008 in the flowchart of FIG. 9 will be described with reference to the flowchart of FIG. 24 which includes the operation of the mechanism described above.

First, the CPU 211 controls the stepping motor 13 such that the recorder/reproducer 11 is moved to face one of the slots 8A to 8E in which the magnetic tape cartridge 10 requested by a high-order device is received (hereinafter, referred to as a "requested slot") (S1100). Although not unillustrated, the ROM 212 stores, as a movement table, the count of pulses supplied to the stepping motor 13 until the recorder/reproducer 11 is moved from the right end seen from the direction of K of FIG. 2 to the position facing each of the slots 8A to 8E. The CPU 211 accesses the movement table and determines the pulse counts and the rotational direction of the stepping motor 13 for the recorder/reproducer 11 to move to the requested slot (i.e., the slot 8A or 8C in the example described above). The CPU 211 then instructs the first pulse generator 215 to output pulses for the determined rotational direction and the pulse counts. Upon reception of the instruction, the first pulse generator 215 outputs the pulses as instructed to rotate the stepping motor 13 in the designated direction. Thus, the stepping motor 13 rotates to move the recorder/reproducer 11 to face the designated slot.

When this control is completed, the CPU 211 then controls the rotation of the stepping motor 17 such that the tilting table 14 and the magazine table 9 pivot in the direction D2 to the tilted position as illustrated in FIGS. 20A and 20B (S1101). If the tape cartridge 10 has been received in the requested slot (8A) as illustrated in FIG. 20B, the tape cartridge 10 is inserted through the opening 11A of the recorder/reproducer 11. The recorder/reproducer 11 acquires the tape cartridge number of the inserted magnetic tape cartridge 10 from the recorded content of the magnetic tape of the inserted magnetic tape cartridge 10. If no magnetic tape cartridge 10 has been received in the requested slot (8A), the recorder/reproducer 11 determines that the magnetic tape cartridge 10 is not received in the requested slot (8A). On the basis of the determination result, the recorder/reproducer 11 outputs the acquired magnetic tape cartridge number or a message that the magnetic tape cartridge is not received.

The CPU 211 receives the output via the second interface 214 and the bus 210 and causes the received result to reflect in the table 2170 which is stored in the RAM 217 in S1006 (S1102).

The CPU 211 then controls ejection of the magnetic tape cartridge 10 inserted in the recorder/reproducer 11 (S1103). In particular, the CPU 211 causes the second pulse generator 216 to output pulses such that the stepping motor 17 rotates in the direction opposite to that in the control of S1101. In this manner, as illustrated in FIG. 19, the magnetic tape cartridge 10 is ejected from the recorder/reproducer 11 and is received in its slot. (Details of this operation have been described with reference to FIG. 19 and are thus not illustrated here). The CPU 211 repeats these processes of S1104 to S1100 until the processes of S1100 to S1103 for the requested slots (in the present embodiment, the slots 8A and 8C) are completed.

Next, an operation of the magnetic tape library device 1 in response to the request from the high-order device 100 will be described with reference to the flowchart of FIG. 25.

First, when the CPU 211 receives the request from the high-order device 100 via the first interface 213 (S2001), the CPU 211 stores the request content in the RAM 217 (S2002). The request includes the tape cartridge number(s). The CPU 211 checks whether the tape cartridge number included in the request is present in the table 2170 which is stored in the RAM 217 (S2003). If the check result is negative, the CPU 211 controls the first interface 213 and transmits an answer message representing "no requested cartridge" to the high-order device 100 (S2004). The process returns to S2001.

If the tape cartridge number is present in the table 2170 in S2003, the CPU 211 checks whether the requested tape cartridge 10 is already inserted in the recorder/reproducer 11 (S2005). If the check result is affirmative, the process then proceeds to S2010 which will be described later.

If it is determined in S2005 that the tape cartridge 10 is not inserted, the CPU 211 controls the ejection of the magnetic tape cartridge 10 from the recorder/reproducer 11. The control of ejection is the same as that of S1103 of FIG. 24 and detailed description thereof will be omitted. In the present embodiment, the ejection control in S2006 is performed regardless of whether the magnetic tape cartridge 10 is actually inserted in the recorder/reproducer 11. Alternatively, the CPU 211 may check whether the magnetic tape cartridge 10 is inserted in the recorder/reproducer 11 and, if the check result is affirmative, the process of S2006 may be performed.

The CPU 211 then controls the stepping motor 13 such that the recorder/reproducer 11 is moved to face the slot corresponding to the magnetic tape cartridge number requested by the high-order device 100 (S2007). This control is achieved by the process similar to that in S1100 of FIG. 24. The CPU 211 then performs the control such that the tilting table 14 and the magazine table 9 pivot in the direction of arrow D2 (S2008). This control is also achieved by the process similar to that in S1101 of FIG. 24.

The CPU 211 stands by until an access authorization signal is received from the recorder/reproducer 11 via the second interface 214 (S2009). This process is performed due to a time lag before the access to the magnetic tape cartridge 10 is actually enabled since the magnetic tape cartridge 10 is inserted in the recorder/reproducer 11. When the CPU 211 receives the access authorization signal from the recorder/reproducer 11, the process proceeds to S2010.

In S2010, the CPU 211 communicates with the recorder/reproducer 11 via the second interface 214 to cause the recorder/reproducer 11 to access in accordance with the request from the high-order device 100. The CPU 211 transmits data acquired from the magnetic tape cartridge 10 to the high-order device 100 via the first interface 213. When the process of S2010 is completed, the process proceeds to S2001.

As described above, in the present embodiment, the recorder/reproducer 11 and the slots 8A to 8E of the magazine 8 are of the same height when the magazine 8 is placed on the magazine table 9. In addition, in the present embodiment, the magazine table 9 and the tilting table 14 on which the recorder/reproducer 11 is placed can be tilted in an integrated manner. In the present embodiment, the insertion and ejection of the magnetic tape cartridge 10 in and from the recorder/reproducer 11 is performed by controlling the integrated tilting. This structure only requires, as the driving mechanism, the stepping motor 13 which moves the recorder/reproducer 11 along the rail 12 and the stepping motor 17 used for the tilting control.

In the related art mechanisms, the magnetic tape cartridge 10 is ejected from the magazine 8 not by tilting as in the present embodiment but by an arm mechanism. The arm mechanism is used for the control such that the magnetic tape cartridge 10 is held by two arms and drawn into the recorder/reproducer 11 with the arms. Such an arm mechanism requires two motors: a motor to produce driving force to hold the magnetic tape cartridge 10; and a motor to produce driving force to draw the magnetic tape cartridge 10 into the recorder/reproducer 11. The present embodiment, however, can be implemented with a reduced number of motors, i.e., the present embodiment requires a single stepping motor 17 to tilt the tilting table or other components.

A separated magnetic tape library device has a further complicated structure because it requires, in addition to the arm mechanism, another rotary motor to direct the magnetic tape cartridge 10 ejected from the magazine 8 to an opening of the recorder/reproducer.

As described above, according to the magnetic tape library device of the present embodiment, the magnetic tape cartridge can be ejected with a simple structure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A tape library apparatus comprising:
   a magazine holder for holding a magazine removable, the magazine storing a plurality of tape cartridges in a linear manner;
   an insertion slot for inserting the magazine;
   a recording/reproducing unit for accessing data in the tape cartridges;
   a first driver for producing a driving force;
   a conveyer for carrying the recording/reproducing unit in the direction of the alignment of the plurality of the tape cartridges, by the driving force produced by the first driver;
   an identification information reader mounted near the insertion slot and on surfaces of the tape cartridges, the image identification information being on a surface of each of the tape cartridges which faces opposite to a surface which faces the conveyer;
   a storage unit for storing related information, the related information being information of relation between the image identification information read by the identification information reader and locations of the tape cartridges stored in the magazine;
   a second driver for moving the tape cartridge in the magazine at opposed position of the conveyer to the recording/reproducing unit; and
   a controller for controlling the first and second drivers, to move one of the tape cartridges stored in the magazine to a position of the recording/reproduction unit.

2. The tape library apparatus according to claim 1, further comprising:
   a tilt mechanism for causing the magazine holder, the recording/reproducing unit, and the conveying unit to be tilted in an integrated manner,
   wherein:
   the second driver is adapted to produce driving force for a tilting movement by the tilt mechanism; and
   the controller is adapted to control, in accordance with information stored in the storage unit, the first driver such that the recording/reproducing unit faces the tape cartridge with identification information requested by a high-order device, and then control the second driver such that the tilt mechanism is tilted such that the magazine is at a higher position than the recording/reproducing unit.

3. A tape library apparatus, comprising:
   a magazine holder for holding a magazine removable, the magazine storing a plurality of tape cartridges in a linear manner;
   an insertion slot for inserting the magazine;
   a recording/reproducing unit for accessing data in the tape cartridges;
   a first driver for producing a driving force;
   a conveyer for carrying the recording/reproducing unit in the direction of the alignment of the plurality of the tape cartridges, by the driving force produced by the first driver;
   a tilt mechanism for causing the magazine holder, the recording/reproducing unit, and the conveying unit to be tilted in an integrated manner,
   a second driver for driving force for a tilting movement by the tilt mechanism; and
   a controller for controlling, in accordance with information stored in the storage unit, the first driver such that the recording/reproducing unit faces the tape cartridge with identification information requested by a high-order device, and then control the second driver such that the tilt mechanism is tilted such that the magazine is at a higher position than the recording/reproducing unit.

* * * * *